US008504849B2

(12) United States Patent
Jogand-Coulomb et al.

(10) Patent No.: US 8,504,849 B2
(45) Date of Patent: *Aug. 6, 2013

(54) METHOD FOR VERSATILE CONTENT CONTROL

(75) Inventors: Fabrice Jogand-Coulomb, San Carlos, CA (US); Michael Holtzman, Cupertino, CA (US); Bahman Qawami, San Jose, CA (US); Ron Barzilai, Kfar Vradim (IL); Hagai Bar-El, Rehovot (IL)

(73) Assignees: SanDisk Technologies Inc., Plano, TX (US); Discretix Technologies Inc., Kfar Netter (IL)

( * ) Notice: Subject to any disclaimer, the term of this patent is extended or adjusted under 35 U.S.C. 154(b) by 1576 days.

This patent is subject to a terminal disclaimer.

(21) Appl. No.: 11/314,411

(22) Filed: Dec. 20, 2005

(65) Prior Publication Data

US 2006/0242068 A1    Oct. 26, 2006

Related U.S. Application Data

(60) Provisional application No. 60/638,804, filed on Dec. 21, 2004.

(51) Int. Cl.
*G06Q 99/00* (2006.01)
*G06F 11/30* (2006.01)
*G06F 12/14* (2006.01)

(52) U.S. Cl.
USPC ............ 713/194; 705/50; 707/694; 707/783; 707/821; 713/168; 713/193; 726/20; 380/44

(58) Field of Classification Search
USPC ........................................................ 713/194
See application file for complete search history.

(56) References Cited

U.S. PATENT DOCUMENTS 4,575,621 A * 3/1986 Dreifus ..................... 235/380
4,780,905 A   10/1988 Cruts et al.
5,052,040 A    9/1991 Preston et al.
(Continued)

FOREIGN PATENT DOCUMENTS

CN    1371056 A    9/2002
EP    0 330 404 A2    8/1989
(Continued)

OTHER PUBLICATIONS

Micron Technology, Inc., 'C400 1.8-Inch NAND Flash Self-Encrypting Drive SSD [product data sheet]', Micron Technology, Inc., 2011, entire document, http://www.micron.com/~/media/Documents/Products/Data%20Sheet/SSD/c400_1_8.pdf.*

(Continued)

*Primary Examiner* — Edan Orgad
*Assistant Examiner* — Ronald Baum
(74) *Attorney, Agent, or Firm* — Brinks Hofer Gilson & Lione

(57) ABSTRACT

Many storage devices are not aware of file systems while many computer host devices read and write data in the form of files. The host device provides a key reference or ID, while the memory system generates a key value in response which is associated with the key ID, which is used as the handle through which the memory retains complete and exclusive control over the generation and use of the key value for cryptographic processes, while the host retains control of files.

43 Claims, 14 Drawing Sheets

U.S. PATENT DOCUMENTS

| | | | |
|---|---|---|---|
| 5,148,481 A * | 9/1992 | Abraham et al. | 380/46 |
| 5,237,609 A | 8/1993 | Kimura | |
| 5,473,692 A | 12/1995 | Davis | |
| 5,581,753 A | 12/1996 | Terry et al. | |
| 5,604,801 A | 2/1997 | Dolan et al. | |
| 5,684,742 A | 11/1997 | Bublitz et al. | |
| 5,687,235 A | 11/1997 | Perlman et al. | |
| 5,857,020 A | 1/1999 | Peterson, Jr. | |
| 5,903,651 A | 5/1999 | Kocher | |
| 5,930,167 A | 7/1999 | Lee et al. | |
| 5,949,877 A | 9/1999 | Traw et al. | |
| 6,026,402 A | 2/2000 | Vossen et al. | |
| 6,038,551 A | 3/2000 | Barlow et al. | |
| 6,073,242 A | 6/2000 | Hardy et al. | |
| 6,094,724 A | 7/2000 | Benhammou et al. | |
| 6,134,550 A | 10/2000 | Van Oorschot et al. | |
| 6,189,097 B1 | 2/2001 | Tycksen, Jr. et al. | |
| 6,343,291 B1 | 1/2002 | Goldman | |
| 6,351,813 B1 | 2/2002 | Mooney et al. | |
| 6,438,666 B2 | 8/2002 | Cassagnol et al. | |
| 6,449,720 B1 * | 9/2002 | Sprague et al. | 713/171 |
| 6,456,528 B1 | 9/2002 | Chen | |
| 6,457,126 B1 | 9/2002 | Nakamura et al. | |
| 6,470,449 B1 * | 10/2002 | Blandford | 713/178 |
| 6,481,632 B2 | 11/2002 | Wentker et al. | |
| 6,513,116 B1 | 1/2003 | Valente | |
| 6,564,314 B1 | 5/2003 | May et al. | |
| 6,584,495 B1 | 6/2003 | Bisset et al. | |
| 6,694,436 B1 | 2/2004 | Audebert | |
| 6,714,921 B2 | 3/2004 | Pirolli et al. | |
| 6,779,113 B1 | 8/2004 | Guthery | |
| 6,785,790 B1 | 8/2004 | Christie et al. | |
| 6,816,900 B1 | 11/2004 | Vogel et al. | |
| 6,865,555 B2 | 3/2005 | Novak | |
| 6,880,084 B1 | 4/2005 | Brittenham et al. | |
| 6,938,162 B1 | 8/2005 | Nagai et al. | |
| 6,970,891 B1 | 11/2005 | Deo et al. | |
| 6,988,175 B2 | 1/2006 | Lasser | |
| 7,010,809 B2 | 3/2006 | Hori et al. | |
| 7,036,020 B2 | 4/2006 | Thibadeau | |
| 7,051,157 B2 | 5/2006 | James | |
| 7,073,063 B2 | 7/2006 | Peinado | |
| 7,073,073 B1 | 7/2006 | Nonaka et al. | |
| 7,103,914 B2 | 9/2006 | Focke et al. | |
| 7,111,173 B1 * | 9/2006 | Scheidt | 713/186 |
| 7,124,170 B1 | 10/2006 | Sibert | |
| 7,124,301 B1 | 10/2006 | Uchida | |
| 7,215,771 B1 | 5/2007 | Hamlin | |
| 7,219,227 B2 | 5/2007 | Hori et al. | |
| 7,225,341 B2 | 5/2007 | Yoshino et al. | |
| 7,269,741 B2 | 9/2007 | Matsui et al. | |
| 7,296,160 B2 | 11/2007 | Hiltgen | |
| 7,322,042 B2 | 1/2008 | Srinivasan et al. | |
| 7,350,204 B2 | 3/2008 | Lambert et al. | |
| 7,363,365 B2 | 4/2008 | Ocko et al. | |
| 7,373,506 B2 | 5/2008 | Asano et al. | |
| 7,426,747 B2 | 9/2008 | Thibadeau | |
| 7,434,069 B2 | 10/2008 | Nessler | |
| 7,437,574 B2 * | 10/2008 | Ronkka et al. | 713/194 |
| 7,478,248 B2 | 1/2009 | Ziv et al. | |
| 7,484,090 B2 | 1/2009 | Ohmori et al. | |
| 7,493,656 B2 | 2/2009 | Goodwill et al. | |
| 7,506,128 B2 | 3/2009 | Deo et al. | |
| 7,523,072 B2 | 4/2009 | Stefik et al. | |
| 7,526,785 B1 | 4/2009 | Pearson et al. | |
| 7,546,334 B2 | 6/2009 | Redlich et al. | |
| 7,546,630 B2 | 6/2009 | Tabi | |
| 7,783,884 B2 | 8/2010 | Nakano et al. | |
| 7,814,557 B2 | 10/2010 | Sakamura et al. | |
| 7,917,964 B2 | 3/2011 | Takashima et al. | |
| 2002/0023219 A1 | 2/2002 | Treffers et al. | |
| 2002/0029340 A1 * | 3/2002 | Pensak et al. | 713/182 |
| 2002/0061105 A1 * | 5/2002 | Nakamura | 380/203 |
| 2002/0065730 A1 | 5/2002 | Nii | |
| 2002/0065867 A1 | 5/2002 | Chauvel | |
| 2002/0136410 A1 * | 9/2002 | Hanna | 380/277 |
| 2002/0138729 A1 | 9/2002 | Miettinen et al. | |
| 2002/0184217 A1 * | 12/2002 | Bisbee et al. | 707/9 |
| 2002/0199001 A1 | 12/2002 | Wenocur et al. | |
| 2003/0023867 A1 | 1/2003 | Thibadeau | |
| 2003/0028699 A1 | 2/2003 | Holtzman et al. | |
| 2003/0056114 A1 | 3/2003 | Goland | |
| 2003/0061504 A1 | 3/2003 | Sprigg et al. | |
| 2003/0149854 A1 | 8/2003 | Yoshino et al. | |
| 2003/0172280 A1 | 9/2003 | Scheidt et al. | |
| 2003/0188117 A1 | 10/2003 | Yoshino et al. | |
| 2003/0196028 A1 | 10/2003 | Maeda et al. | |
| 2003/0200402 A1 | 10/2003 | Willman et al. | |
| 2003/0212888 A1 | 11/2003 | Wildish et al. | |
| 2003/0212895 A1 | 11/2003 | Kisliakov | |
| 2003/0217011 A1 | 11/2003 | Peinado et al. | |
| 2004/0015694 A1 | 1/2004 | DeTreville | |
| 2004/0026496 A1 * | 2/2004 | Zuili | 235/379 |
| 2004/0039911 A1 | 2/2004 | Oka et al. | |
| 2004/0044625 A1 | 3/2004 | Sakamura et al. | |
| 2004/0059946 A1 | 3/2004 | Price | |
| 2004/0064618 A1 | 4/2004 | Farrell et al. | |
| 2004/0083370 A1 | 4/2004 | de Jong | |
| 2004/0103288 A1 | 5/2004 | Ziv et al. | |
| 2004/0132437 A1 | 7/2004 | Ohmori et al. | |
| 2004/0139021 A1 | 7/2004 | Reed et al. | |
| 2004/0144840 A1 | 7/2004 | Lee et al. | |
| 2004/0193606 A1 | 9/2004 | Arai et al. | |
| 2004/0247129 A1 | 12/2004 | Patariu et al. | |
| 2005/0015415 A1 | 1/2005 | Garimella et al. | |
| 2005/0018472 A1 * | 1/2005 | Lim | 365/154 |
| 2005/0022025 A1 | 1/2005 | Hug | |
| 2005/0049931 A1 | 3/2005 | Wisnudel et al. | |
| 2005/0154875 A1 * | 7/2005 | Chao | 713/156 |
| 2005/0160281 A1 | 7/2005 | Thibadeau | |
| 2005/0180209 A1 | 8/2005 | Lasser | |
| 2005/0193025 A1 | 9/2005 | Mosek | |
| 2005/0209716 A1 | 9/2005 | Buhr et al. | |
| 2005/0210241 A1 | 9/2005 | Lee et al. | |
| 2005/0256838 A1 | 11/2005 | Lasser | |
| 2005/0262361 A1 * | 11/2005 | Thibadeau | 713/193 |
| 2005/0289354 A1 | 12/2005 | Borthakur et al. | |
| 2006/0036873 A1 | 2/2006 | Ho et al. | |
| 2006/0095793 A1 | 5/2006 | Hall | |
| 2006/0107047 A1 | 5/2006 | Bar-El | |
| 2006/0112241 A1 | 5/2006 | Weiss et al. | |
| 2006/0120314 A1 | 6/2006 | Krantz et al. | |
| 2006/0126422 A1 | 6/2006 | Takagi et al. | |
| 2006/0129824 A1 | 6/2006 | Hoff et al. | |
| 2006/0161725 A1 | 7/2006 | Lee et al. | |
| 2006/0195907 A1 | 8/2006 | Delfs et al. | |
| 2006/0232826 A1 | 10/2006 | Bar-El | |
| 2006/0242068 A1 | 10/2006 | Jogand-Coulomb et al. | |
| 2006/0242151 A1 | 10/2006 | Jogand-Coulomb et al. | |
| 2006/0262928 A1 | 11/2006 | Bar-El et al. | |
| 2006/0272027 A1 | 11/2006 | Noble | |
| 2007/0050849 A1 | 3/2007 | Takashima | |
| 2007/0061502 A1 | 3/2007 | Lasser et al. | |
| 2007/0143555 A1 | 6/2007 | Nemiroff et al. | |
| 2007/0180210 A1 | 8/2007 | Thibadeau | |
| 2008/0072060 A1 | 3/2008 | Cannon et al. | |
| 2009/0125730 A1 | 5/2009 | Pagan | |
| 2009/0144347 A1 | 6/2009 | Boyd et al. | |

FOREIGN PATENT DOCUMENTS

| | | |
|---|---|---|
| EP | 0 919 904 A2 | 6/1999 |
| EP | 1 117 206 | 7/2001 |
| EP | 1 209 657 A1 | 5/2002 |
| EP | 1 361 527 | 11/2003 |
| EP | 1 365 306 A2 | 11/2003 |
| EP | 1 467 312 A1 | 10/2004 |
| EP | 1 594 250 | 11/2005 |
| GB | 2 391 082 A | 1/2004 |
| JP | 09-298537 | 11/1997 |
| JP | 10-327147 | 12/1998 |
| JP | 11-039437 | 2/1999 |
| JP | H11-161552 | 6/1999 |
| JP | 2002-288453 A | 4/2002 |
| JP | 2003-233594 | 8/2003 |
| JP | 2003-316651 | 11/2003 |
| JP | 2003-337632 | 11/2003 |
| JP | 2003-345742 | 12/2003 |

| | | |
|---|---|---|
| JP | 2004-199138 | 7/2004 |
| JP | 2004-266652 | 9/2004 |
| JP | 2005-124097 | 5/2005 |
| JP | 2005-352962 | 12/2005 |
| JP | 2006-085647 | 3/2006 |
| KR | 2004-0063071 A | 7/2004 |
| TW | 588244 | 5/2004 |
| TW | 200502758 A | 1/2005 |
| WO | WO 98/07255 | 2/1998 |
| WO | WO 00/42491 | 7/2000 |
| WO | WO 02/01368 A2 | 1/2002 |
| WO | WO 02/42912 A1 | 5/2002 |
| WO | WO 02/063847 | 8/2002 |
| WO | WO 02/096016 | 11/2002 |
| WO | WO 03/107589 | 12/2003 |
| WO | WO 2004/034202 | 4/2004 |
| WO | WO 2004/086228 A | 10/2004 |
| WO | WO 2004/112036 A1 | 12/2004 |
| WO | WO 2005/104431 A1 | 11/2005 |
| WO | WO 2006/066604 | 6/2006 |
| WO | WO 2006/069194 | 6/2006 |
| WO | WO 2006/069274 | 6/2006 |
| WO | WO 2006/069311 | 6/2006 |
| WO | WO 2006/069312 | 6/2006 |

OTHER PUBLICATIONS

Office Action from U.S. Appl. No. 11/313,536, dated Oct. 17, 2007.
Buhse, "Implications of Digital Rights Management for Online Music—A Business Perspective," T. Sander (Ed.), Security and Privacy in Digital Rights Management, ACM CCS-8 Workshop DRM 2001, LNCS 2320, pp. 201-212.
Dialog OneSearch, Jun. 26, 2006, 5 pages, http://www.dialog.com/dwpi/.
Dialog OneSearch, Jun. 2006, 50 pages, http://www.dialog.com/dwpi/.
Dialog OneSearch, Sep. 12, 2006, 56 pages, http://www.dialog.com/dwpi/.
Dialog OneSearch, Sep. 15, 2006, 55 pages, http://www.dialog.com/dwpi/.
Hinarejos et al., "Revocation scheme for PMI based upon the tracing of certificates chains," Computational Science and its Applications—ICCSA 2006, International Conference, Proceedings (Lecture Notes in Computer Science, vol. 3983), pp. 1098-1106.
Housley et al., "Internet X.509 Public Key Infrastructure Certificate and CRL Profile," Network Working Group, RFC 2459, The Internet Society, Jan. 1999, 137 pages.
Oasis, "Web Services Security X.509 Certificate Token Profile," Oasis Standard 200401, Mar. 15, 2004, 16 pages.
Orlowski, "Everything you ever wanted to know about CPRM, but ZDNet wouldn't tell you . . . ", The Register, Jan. 10, 2001, 6 pages. http://theregister.co.uk/2001/01/10/everything_you_ever_wanted/print.html.
Ortiz, "An Introduction to Java Card Technology—Part 1," May 29, 2003, 17 pages. http://developers.sun.com/techtopics/mobility/javacard/articles/javacard1/.
RSA Laboratories, "PKCS#1: RSA Encryption Standard," An RSA Laboratories Technical Note, Version 1.5, Revised Nov. 1, 1993, 17 pages.
Sandhu et al., "Access Control: Principles and Practice," IEEE Communications Magazine, IEEE Service Center, New York, NY, vol. 32, No. 9, Sep. 1, 1994, pp. 40-48 (2-5).
EPO/ISA, "Invitation to Pay Additional Fees," for International Application No. PCT/US2005/046478 mailed Jul. 11, 2006, 5 pages.
EPO/ISA, "Notification of Transmittal of the International Search Report and the Written Opinion of the International Searching Authority, or the Declaration" for International Application No. PCT/US2005/046478 mailed Sep. 25, 2006, 14 pages.
EPO/ISA, "Notification of Transmittal of the International Search Report and the Written Opinion of the International Searching Authority, or the Declaration" for International Application No. PCT/US2005/046793 mailed Jun. 7, 2006, 9 pages.
EPO/ISA, "Notification of Transmittal of the International Search Report and the Written Opinion of the International Searching Authority, or the Declaration" for International Application No. PCT/US2005/046795 mailed Jun. 7, 2006, 9 pages.
EPO/ISA, "Invitation to Pay Additional Fees," for International Application No. PCT/US2005/046689 mailed Jul. 11, 2006, 5 pages.
EPO/ISA, "Notification of Transmittal of the International Search Report and the Written Opinion of the International Searching Authority, or the Declaration" for International Application No. PCT/US2005/046689 mailed Sep. 6, 2006, 16 pages.
Office Action for U.S. Appl. No. 11/313,538, dated Oct. 29, 2007.
Office Action for U.S. Appl. No. 11/313,870, dated Oct. 29, 2007.
Office Action for U.S. Appl. No. 11/314,055, dated Oct. 29, 2007.
Office Action for U.S. Appl. No. 11/314,053, dated Nov. 9, 2007.
Office Action for U.S. Appl. No. 11/313,538, 27 pages, Nov. 20, 2008.
Office Action for U.S. Appl. No. 11/557,056, dated Mar. 16, 2009, 25 pages.
International Search Report and Written Opinion for PCT/US2007/015431, dated Apr. 16, 2008, 14 pages.
US Office Action for U.S. Appl. No. 11/313,538 dated Apr. 9, 2008, 16 pages.
US Office Action for U.S. Appl. No. 11/313,870 dated Apr. 1, 2008, 13 pages.
US Office Action for U.S. Appl. No. 11/313,536 dated Apr. 14, 2008, 13 pages.
US Office Action for U.S. Appl. No. 11/314,055 dated Apr. 1, 2008, 16 pages.
US Office Action for U.S. Appl. No. 11/314,053 dated Feb. 7, 2008, 16 pages.
International Telecommunication Union, "Series X: Data Networks, Open System Communications and Security (Information Technology—Open Systems Interconnection—The Directory: Public-Key and Attribute Certificate Frameworks)," ITU-T, X.509, Aug. 2005, pp. 1-170.
Van Maffaert, A. et al., "Digital Rights Management: DRM is a Key Enabler for the Future Growth of the Broadband Access Market, and the Telecom/Networking Marking in General", Alcatel Telecommunications Review, Alcatel, Paris Cedex, FR, Apr. 2003, 8 pages.
International Search Report and Written Opinion for PCT/US2007/015301, dated Jan. 10, 2008, 12 pages.
International Search Report and Written Opinion for PCT/US2007/015304, dated Mar. 25, 2008, 12 pages.
International Search Report and Written Opinion from PCT Application Serial No. PCT/US2007/015430, dated Jan. 17, 2008, 11 pages.
International Search Report and Written Opinion for PCT/US2007/015432, dated Jan. 17, 2008, 13 pages.
Donnan, R.A., "Transmission Synchronizing Method", *IBM Technical Disclsosure Bulletin*, vol. 11, No. 11, pp. 1570, Apr. 1969.
Kikuchi, H. et al., "Performance Evaluation of Public-Key Certificate Revocation System with Balanced Hash Tree", *Parallel Processing, 1999 International Workshop on Aizu-Wakamatsu*, pp. 204-209, 1999.
Llloyd, S. et al., "Understanding Certification Path Construction", *PKI Forum*, pp. 1-14, Sep. 2002.
Thomas, T., "A Mandatory Access Control Mechanism for the Unix® File System", *Proceedings of the Aerospace Computer Security Applications Conference*, Orlando, Dec. 12-16, 1988, Washington, *IEEE Comp. Soc. Press*, US, pp. 173-177, Dec. 12, 1988.
Office Action for U.S. Appl. No. 11/557,049, dated Dec. 17, 2009, 31 pages.
Kocher, P., "On Certificate Revocation and Validation", Lecture Notes in Computer Science, Springer Berlin Heidelberg, 1998.
Random Number Generator, Seed. In Webster's New World™ Computer Dictionary. Wiley Publishing, Inc., 2003.
Office Action for U.S. Appl. No. 11/313,538, dated Jun. 8, 2009, 29 pages.
Office Action for U.S. Appl. No. 11/314,052, dated May 12, 2009, 11 pages.
Office Action for U.S. Appl. No. 11/314,410, dated May 13, 2009, 15 pages.
Office Action for U.S. Appl. No. 11/557,051, dated Sep. 29, 2009, 10 pages.

Office Action for U.S. Appl. No. 11/557,039, dated Oct. 13, 2009, 14 pages.
Office Action for U.S. Appl. No. 11/557,052, dated Sep. 29, 2009, 9 pages.
Office Action for U.S. Appl. No. 11/557,041, dated Oct. 13, 2009, 19 pages.
Office Action for U.S. Appl. No. 11/557,028, dated Nov. 10, 2009, 19 pages.
Office Action for U.S. Appl. No. 11/313,538, dated Jan. 13, 2010, 33 pages.
Office Action for U.S. Appl. No. 11/313,538, dated May 24, 2010, 34 pages.
Office Action for U.S. Appl. No. 11/314,052, dated Feb. 18, 2010, 13 pages.
Office Action for U.S. Appl. No. 11/314,052, dated Jun. 8, 2010, 13 pages.
Office Action for U.S. Appl. No. 11/314,410, dated Mar. 5, 2010, 17 pages.
Office Action for U.S. Appl. No. 11/557,006, dated Jun. 25, 2010, 14 pages.
Office Action for U.S. Appl. No. 11/557,010, dated Feb. 16, 2010, 13 pages.
Office Action for U.S. Appl. No. 11/557,028, dated May 24, 2010, 17 pages.
Office Action for U.S. Appl. No. 11/557,041, dated Jun. 9, 2010, 17 pages.
Office Action for U.S. Appl. No. 11/557,049, dated Jul. 7, 2010, 29 pages.
Office Action for U.S. Appl. No. 11/557,052, dated Mar. 9, 2010, 9 pages.
Translation of Office Action for Chines Patent Application Serial No. 200780025287.1, dated Jun. 12, 2010, 5 pages.
Translation of Office Action for Chines Patent Application Serial No. 200780025765.9, dated Jul. 20, 2010, 4 pages.
Translation of Office Action for Chines Patent Application Serial No. 200780025785.6, dated Jun. 24, 2010, 4 pages.
Translation of Office Action for Chines Patent Application Serial No. 200780025848.8, dated Jul. 20, 2010, 1 page.
European Examination Report for European Patent Application Serial No. 05 855 098.9, dated Apr. 15, 2010, 6 pages.
European Examination Report for European Patent Application Serial No. 05 855 274.6, dated Jun. 14, 2010, 4 pages.
European Examination Report for European Patent Application Serial No. 10 002 604.6, dated May 4, 2010, 6 pages.
Posey, Brien, "Understanding MS Windows File Associations", *Microsoft Technet. TechRepublic*, Sep. 1999, 11 pages.
Office Action for U.S. Appl. No. 11/314,052, dated Nov. 18, 2010, 14 pages.
CardWerk, "ISO 7816-4: Inter-Industry Commands for Interchange, Section 3: Definitions," 2009, http://www.cardwerk.com/smartcards/smartcard_standard_ISO7816-4_3_definitions.aspx.
Office Action for U.S. Appl. No. 11/313,538, dated Feb. 10, 2011, 33 pages.
Office Action for U.S. Appl. No. 11/557,006, dated Feb. 15, 2011, 14 pages.
Office Action for U.S. Appl. No. 11/557,028, dated Feb. 22, 2011, 17 pages.
Office Action for U.S. Appl. No. 11/557,041, dated Feb. 4, 2011, 14 pages.
International Search Report and Written Opinion for PCT/US2010/057425, dated Mar. 17, 2011, 10 pages.
Office Action for U.S. Appl. No. 12/624,036, dated Apr. 1, 2011, 24 pages.
Office Action for U.S. Appl. No. 11/557,052, dated Apr. 27, 2011, 10 pages.
Office Action for U.S. Appl. No. 12/338,738, dated May 13, 2011, 23 pages.
Office Action for Japanese Patent Application Serial No. 2007-548491, dated Mar. 22, 2011, 4 pages.
Office Action for Japanese Patent Application Serial No. 2007-548523, dated Mar. 22, 2011, 4 pages.
Office Action for Japanese Patent Application Serial No. 2010-049119, dated Mar. 22, 2011, 7 pages.
Office Action for Japanese Patent Application Serial No. 2010-548449, dated Mar. 22, 2011, 7 pages.
Notice of Allowance for U.S. Appl. No. 11/313,538, dated Aug. 17, 2011, 9 pages.
Office Action for U.S. Appl. No. 11/557,028, dated Aug. 15, 2011, 21 pages.
Office Action for Chinese Patent Application Serial No. 2007800257165.9 dated May 17, 2011, 11 pages.
Office Action for U.S. Appl. No. 11/557,041, dated Aug. 25, 2011, 14 pages.
Office Action for Chinese Patent Application Serial No. 200780025736.2, dated Jul. 13, 2011, 5 pages.
Examination Report for European Patent Application Serial No. 05855366.0, dated Aug. 17, 2011, 9 pages.
Office Action for European Patent Application Serial No. 10190137.9, dated Sep. 7, 2011, 6 pages.
Office Action for European Patent Application Serial No. 07835981.7, dated Aug. 24, 2011, 9 pages.
Office Action for U.S. Appl. No. 11/557,049, dated Oct. 21, 2011, 31 pages.
Office Action for Chinese Patent Application Serial No. 200580048232.3, dated Dec. 1, 2011, 14 pages.
Office Action for Chinese Patent Application Serial No. 200780025287.1, dated Sep. 28, 2011, 10 pages.
Notification of Reasons for Refusal for Japanese Patent Application Serial No. 2009-518355, dated Oct. 25, 2011, 5 pages.
Notification of Reasons for Refusal for Japanese Patent Application Serial No. 2009-518357, dated Oct. 25, 2011, 4 pages.
Office Action for U.S. Appl. No. 11/557,006, dated Dec. 19, 2011, 11 pages.
Office Action for U.S. Appl. No. 12/641,160, dated Jan. 5, 2012, 14 pages.
Notification of Reasons for Refusal for Japanese Patent Application Serial No. 2009-518323, dated Dec. 20, 2011, 7 pages.
Kikuchi, H. et al., "Performance Evaluation of Public-Key Certificate Revocation System with Balanced Hash Tree", *Parallel Processing, 1999. Proceedings. 1999 International Workshops*, Sep. 24, 1999, pp. 204-209.
Umezawa, K. et al., "Development and Evaluation of Certificate Verification System in Mobile Environment", *Computer Security Symposium 2005 (CSS2005)* vol. I of II, Japan, *Information Processing Society of Japan*, vol. 2005, No. 13, Oct. 26, 2005, pp. 121-127 (Abstract Only).
Office Action for U.S. Appl. No. 11/314,052, dated Aug. 8, 2012, 14 pages.
Notice of Allowance for U.S. Appl. No. 11/557,052, dated Jul. 20, 2012, 7 pages.
Office Action for Chinese Patent Application Serial No. 200910211956.5, dated Apr. 23, 2012, 6 pages.
Notice of Preliminary Rejection for Korean Patent Application Serial No. 10-2007-7016633, dated Jun. 13, 2012, 7 pages.
Notice of Preliminary Rejection for Korean Patent Application Serial No. 10-2007-7016643, dated Jun. 19, 2012, 7 pages.
Decision of Rejection for Chinese Office Action Serial No. 200780025785.6, dated Jan. 18, 2012, 11 pages.
Decision of Refusal for Japanese Patent Application Serial No. 2009-518357, dated Feb. 14, 2012, 8 pages.
Office Action for Taiwanese Patent Application Serial No. 094145710, dated Jan. 10, 2012, 16 pages.
Office Action for U.S. Appl. No. 12/338,738, dated Apr. 11, 2012, 25 pages.
Notice of Allowance for U.S. Appl. No. 11/557,028, dated Feb. 3, 2012, 10 pages.
Office Action for U.S. Appl. No. 11/557,052, dated Jan. 30, 2012, 13 pages.
Office Action for U.S. Appl. No. 12/624,036, dated Jan. 18, 2012, 31 pages.
Office Action for U.S. Appl. No. 11557,041, dated Oct. 12, 2012, 20 pages.
Office Action for Korean Patent Application Serial No. 2009-7002319, dated Nov. 19, 2012, 7 pages.
Notification of Reasons for Refusal for Japanese Patent Application Serial No. 2009518356, dated Nov. 20, 2012, 8 pages.

Office Action for Chinese Patent Application Serial No. 200780025287.1, dated Jul. 4, 2012, 14 pages.
Office Action for Chinese Patent Application Serial No. 200910261304.2, dated Jun. 21, 2012, 6 pages.
Office Action for Taiwanese Patent Serial No. 094145707, dated Aug. 21, 2012, 7 pages.
Office Action for Taiwanese Patent Serial No. 094145710, dated Aug. 15, 2012, 16 pages.
Office Action for U.S. Appl. No. 12/641,160, dated Sep. 13, 2012, 10 pages.
Office Action for U.S. Appl. No. 11/557,049, dated May 21, 2012, 31 pages.
Office Action for Japanese Patent Application Serial No. 2009-518324, dated May 29, 2012, 6 pages.
Office Action for Korean Patent Application Serial No. 10-2009-7026878, dated Apr. 27, 2012, 5 pages.
Office Action for Korean Patent Application Serial No. 10-2007-7016639, dated Apr. 27, 2012, 7 pages.
Decision of Refusal for Japanese Patent Application Serial No. 2009-518324, dated Dec. 25, 2012, 4 pages.
Notice of Final Rejection for Korean Patent Application Serial No. 10-2007-7016639, dated Dec. 21, 2012, 6 pages.
Office Action for Taiwanese Patent Application Serial No. 094145711, dated Nov. 26, 2012, 15 pages.
Office Action for Chinese Patent Application Serial No. 200780025736.2, dated Dec. 5, 2012, 5 pages.
Office Action for U.S. Appl. No. 11/557,049, dated Jan. 31, 2013, 29 pages.
Office Action for Chinese Patent Application Serial No. 200910211956.5, dated Feb. 5, 2013, 6 pages.
Notice of Allowance for Chinese Patent Application Serial No. 200910261304.2, dated Mar. 5, 2013, 10 pages.
Office Action for U.S. Appl. No. 11/314,052, dated Mar. 22, 2013, 15 pages.
Office Action for U.S. Appl. No. 11/557,041, dated Mar. 28, 2013, 22 pages.
Office Action for U.S. Appl. No. 12/338,738, dated Apr. 24, 2013, 28 pages.

* cited by examiner

Login/Password Type

Challenge/Response Type
Host Authentication

Challenge/Response Type
Mutual Authentication

Challenge/Response Type
Card Authentication

METHOD FOR VERSATILE CONTENT CONTROL

CROSS-REFERENCE TO RELATED APPLICATIONS

This application claims the benefit of U.S. Provisional Application No. 60/638,804, filed Dec. 21, 2004, entitled, "Memory System with Versatile Content Control." This application is further related to U.S. patent application Ser. No. 11/314,410, entitled "Memory System with Versatile Content Control"; this application is further related to U.S. patent application Ser. No. 11/313,870, entitled "Method Using Control Structure for Versatile Content Control"; this application is further related to U.S. patent application Ser. No. 11/313,536, entitled "Control Structure for Versatile Content Control"; this application is further related to U.S. patent application Ser. No. 11/313,538, entitled "Method for Creating Control Structure for Versatile Content Control"; this application is further related to U.S. patent application Ser. No. 11/314,055, entitled "System for Creating Control Structure for Versatile Content Control"; this application is further related to U.S. patent application Ser. No. 11/314,052, entitled "Method for Versatile Content Control with Partitioning"; this application is further related to U.S. patent application Ser. No. 11/314,053, entitled "Versatile Content Control with Partitioning"; all of which are filed on the same day as the present application. These applications are incorporated in their entirety by reference as if fully set forth herein.

BACKGROUND OF THE INVENTION

This invention relates in general to memory systems, and in particular to a memory system with versatile content control features.

The computing device market is developing in the direction of including content storage on mobile storage devices so as to increase the average revenue by generating more data exchanges. This means that the content in a mobile storage medium has to be protected when used on a computing device. Content includes valuable data, which may be data owned by a party other than the one that manufactures or sells the storage device.

One type of storage device with encryption capability is described in U.S. Pat. No. 6,457,126. The capability provided by this device, is however, quite limited. It is therefore desirable to provide a memory system with more versatile content control features.

SUMMARY OF THE INVENTION

The protection of content in a mobile storage medium can involve the encryption of data in the medium so that only authorized users or applications have access to keys used for encrypting data stored in the medium. In some prior systems, the key used for encrypting and decrypting data is stored in devices external to the mobile storage medium. In such circumstances, the company or individual who owns proprietary interest in the content may not have much control over the usage of the content in the medium. Since the key used for encrypting data in the medium exists external to the medium, this key may be passed from one device to another in a manner not subject to control by the content proprietor. The owner of proprietor interest will be in the better position to control access to the content in the medium if the encryption-decryption key is stored in the medium itself and substantially inaccessible to external devices, according to one of the features of the invention.

By making the key essentially inaccessible from outside the medium, this feature provides portability to secured content. Thus, the storage device containing secured content ciphered with such a key can be used for access by a variety of host devices without the danger of security breach, since the device has exclusive control of access to the key. Only those host devices with the proper credentials are able to access the key.

To enhance the commercial value of the content stored in the mobile storage medium, it is desirable for the owner of proprietary interest in the content to be able to grant different permissions to different entities for accessing the content. Therefore another feature of the invention is based on the recognition that an access policy may be stored which grants different permissions (e.g. to different authorized entities) for accessing data stored in the medium. A system incorporating a combination of the two above features is particularly advantageous. On the one hand, the content owner or proprietor has the ability to control access to the content by using keys that are substantially inaccessible to external devices and at the same time has the ability to grant different permissions for accessing content in the medium. Thus, even where external devices gain access, their access may still be subject to the different permissions set by the content owner or proprietor recorded in the storage medium.

Yet another feature is based on the recognition that when the above-described policy, where different permissions are granted to different authorized entities, is implemented in a flash memory, this results in a particularly useful medium for content protection.

Many storage devices are not aware of file systems while many computer host devices read and write data in the form of files. According to another feature, the host device provides a key reference or ID, while the memory system generates a key value in response which is associated with the key ID, where the key value is used in cryptographic processing data in a file associated with the key ID. The host associates the key ID with the file to be processed cryptographically by the memory system. Thus the key ID is used by the computing device and memory as the handle through which the memory retains complete and exclusive control over the generation and use of the key value for cryptographic processes, while the host retains control of files.

In some mobile storage devices such as smart cards, the card controller manages the file system. In many other types of mobile storage devices, such as flash memories, magnetic or optical discs, the device controller is not aware of the file system; instead, the device controller relies on a host device (e.g. a personal computer, digital camera, MP3 player, personal digital assistants, cellular phones) to manage the file system. The various aspects of this invention may be readily incorporated into such types of storage devices where the device controller is not aware of the file system. This means that the various features of this invention may be practiced on a wide variety of existing mobile storage devices without requiring a re-design of such devices to make the device controller in such devices become aware of and able to manage the file system.

A tree structure stored in the storage medium provides control over what an entity can do even after gaining access. Each of the nodes of the tree specifies permissions by an entity who has gained entry through such node of the tree. Some trees have different levels, where the permission or permissions at a node of the tree has a predetermined relationship to permission or permissions at another node at a higher or lower or the same level in the same tree. By requiring entities to comply with the permissions so specified at each of the nodes, the tree feature of this application allows a content owner to control which entities can take action, and which actions each of the entities can take, irrespective of whether the tree has different levels.

To enhance the commercial value that can be provided by the mobile storage medium, it is desirable for mobile storage devices to be capable of supporting more than one application simultaneously. When two or more applications are accessing the mobile storage device at the same time, it can be important to be able to separate the operations of the two or more applications so that they do not interfere with one another in a phenomena referred to herein as crosstalk. Therefore another feature of the invention is based on the recognition that two or more trees which are preferably hierarchical may be provided for controlling access to the memory. Each tree comprises nodes at different levels for controlling access to data by a corresponding set of entities where a node of each tree specifies permission or permissions of the corresponding entity or entities for accessing memory data. The permission or permissions at a node of each of the trees has a predetermined relationship to permission or permissions at another node at a higher or lower level in the same tree. Preferably, there is no crosstalk between at least two of the trees.

From the above, it will be evident that trees are powerful structures that can be used for content security. One of the important controls provided is the control over the creation of trees. Thus, according to another feature of the invention, the mobile storage device may be provided with a system agent that is able to create at least one hierarchical tree comprising nodes at different levels for controlling access to data stored in the memory by corresponding entities. Each node of the tree specifies permission or permissions of a corresponding entity or entities for accessing memory data. The permission or permissions at the node of each of the trees has a predetermined relationship to permission or permissions at nodes at a higher or lower or the same level in the same tree. Thus, the mobile storage devices may be issued without any trees already created so that the purchaser of the devices has a free hand in creating hierarchical trees adapted to the applications the purchaser has in mind. Alternatively, the mobile storage devices may also be issued with the trees already created so that a purchaser does not have to go through the trouble of creating the trees. In both situations, preferably certain functionalities of the trees can become fixed after the devices are made so that they cannot be further changed or altered. This provides greater control over access to the content in the device by the content owner. Thus, in one embodiment, the system agent can preferably be disabled so that no additional trees can be created.

In some mobile storage devices, content protection is afforded by dividing the memory into separate areas where access to protected areas requires prior authentication. While such feature does provide some protection, it does not protect against a user who obtained a password by illicit means. Thus, another aspect of the invention is based on the recognition that a mechanism or structure may be provided to divide a memory into partitions and so that at least some data in the partitions can be encrypted with a key, so that in addition to authentication that is required for accessing some of the partitions, access to one or more keys may be required to decrypt the encrypted data in such partitions.

In some applications, it may be more convenient to the user to be able to log in the memory system using one application, and then be able to use different applications to access protected content without having to log in again. In such event, all of the content that the user wishes to access in this manner may be associated with a first account, so that all such content can be accessed via different applications (e.g. music player, email, cellular communication etc.) without having to log in multiple times. Then a different set of authentication information may then be used for logging in to access protected content that is in an account different from the first account, even where the different accounts are for the same user or entity.

The above-described features may be used individually, or may be combined in any combination, in storage systems to provide greater versatility of control and/or protection for the content owner.

BRIEF DESCRIPTION OF THE DRAWINGS

For simplicity in description, identical components are labeled by the same numerals in this application.

DETAILED DESCRIPTION OF EXEMPLARY EMBODIMENTS

Figure 1:
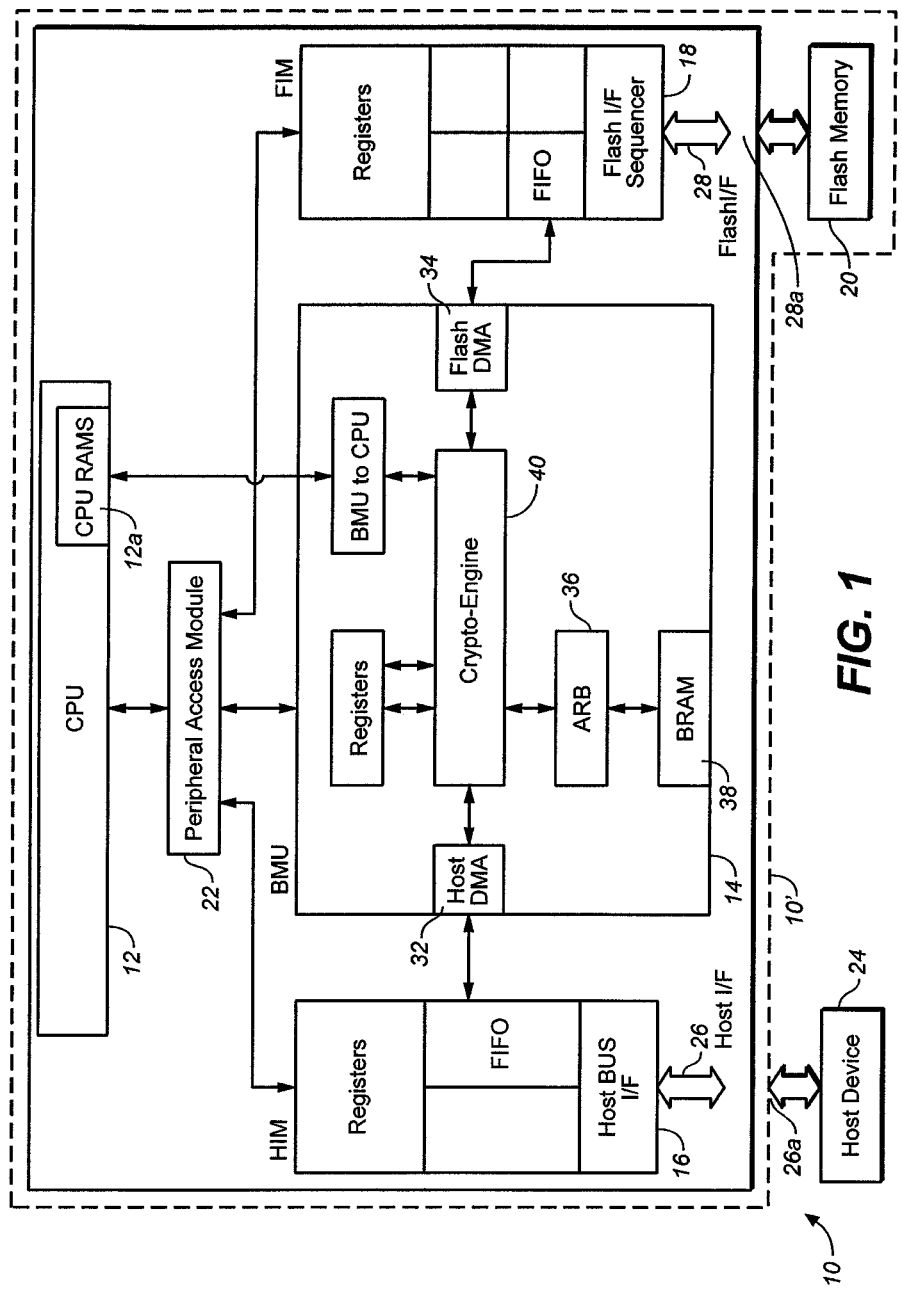
FIG. 1 is a block diagram of a memory system in communication with the host device useful for illustrating this invention.

An example memory system in which the various aspects of the present invention may be implemented is illustrated by the block diagram of FIG. 1. As shown in FIG. 1, the memory system 10 includes a central processing unit (CPU) 12, a buffer management unit (BMU) 14, a host interface module (HIM) 16 and a flash interface module (FIM) 18, a flash memory 20 and a peripheral access module (PAM) 22. Memory system 10 communicates with a host device 24 through a host interface bus 26 and port 26a. The flash memory 20 which may be of the NAND type, provides data storage for the host device 24. The software code for CPU 12 may also be stored in flash memory 20. FIM 18 connects to the flash memory 20 through a flash interface bus 28 and port 28a. HIM 16 is suitable for connection to a host system like a digital camera, personal computer, personal digital assistants (PDA), digital media players, MP-3 players, cellular telephones or other digital devices. The peripheral access module 22 selects the appropriate controller module such as FIM, HIM and BMU for communication with the CPU 12. In one embodiment, all of the components of system 10 within the dotted line box may be enclosed in a single unit such as in memory card or stick 10' and preferably encapsulated.

While the invention is illustrated herein by reference to flash memories, the invention may also be applicable to other types of memories, such as magnetic disks, optical CDs, as well as all other types of rewrite-able non volatile memory systems.

The buffer management unit 14 includes a host direct memory access (HDMA) 32, a flash direct memory access (FDMA) 34, an arbiter 36, a buffer random access memory (BRAM) 38 and a crypto-engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to the BRAM 38. The HDMA 32 and FDMA 34 are responsible for data transported between the HIM 16, FIM 18 and BRAM 38 or the CPU random access memory (CPU RAM)12a. The operation of the HDMA 32 and of the FDMA 34 are conventional and need not be described in detail herein. The BRAM 38 is used to store data passed between the host device 24 and flash memory 20. The HDMA 32 and FDMA 34 are responsible for transferring the data between HIM 16/FIM 18 and BRAM 38 or the CPU RAM 12a and for indicating sector completion.

For improved security of the content stored in memory 20, memory system 10 generates the key value(s) that are used for encryption and/or decryption, where this value(s) is substantially not accessible to external devices such as host device 24. However, encryption and decryption is typically done file by file, since the host device reads and writes data to memory system 10 in the form of files. Like many other types of storage devices, memory device 10 is not aware of files or file systems. While memory 20 does store a file allocation table (FAT) where the logical addresses of the files are identified, the FAT is typically accessed and managed by the host device 24 and not by the controller 12. Therefore, in order to encrypt data in a particular file, the controller 12 will have to rely on the host device to send the logical addresses of the data in the file in memory 20, so that the data of the particular file can be found and encrypted and/or decrypted by system 10 using the key value(s) available only to system 10.

To provide a handle for both the host device 24 and memory system 10 to refer to the same key(s) for cryptographically processing data in files, the host device provides a reference for each of the key values generated by system 10, where such reference may simply be a key ID. Thus, the Host 24 associates each file that is cryptographically processed by system 10 with a key ID, and the system 10 associates each key value that is used to cryptographically process data with a key ID provided by the host. Thus, when the host requests that a file be cryptographically processed, it will send the request along with a key ID along with the logical addresses of data to be fetched from or stored in memory 20 to system 10. System 10 generates a key value and associates the key ID provided by the host 24 with such value, and performs the cryptographic processing. In this manner, no change needs to be made in the manner memory system 10 operates while allowing it to completely control the cryptographic processing using the key(s), including exclusive access to the key value(s). In other words, system 10 continues to allow the host 24 to manage the files by having exclusive control of FAT, while it maintains exclusive control for the generation and management of the key value(s) used for cryptographic processing. The host device 24 has no part in the generation and management of the key value(s) used for cryptographic processing of data.

The key ID provided by the host 24 and the key value generated by the memory system form two attributes of a quantity referred to below as the "content encryption key" or CEK in one of the embodiments. While the host 24 may associate each key ID with one or more files, host 24 may also associate each key ID with unorganized data or data organized in any manner, and not limited to data organized into complete files.

In order for a user or application to gain access to protected content or area in system 10, it will need to be authenticated using a credential which is pre-registered with system 10. A credential is tied to the access rights granted to the particular user or application with such credential. In the pre-registration process, system 10 stores a record of the identity and credential of the user or application, and the access rights associated with such identity and credential determined by the user or application and provided through the host 24. After the pre-registration has been completed, when the user or application requests to write data to memory 20, it will need to provide through the host device its identity and credential, a key ID for encrypting the data, and the logical addresses where the encrypted data is to be stored. System 10 generates a key value and associates this value with the key ID provided by the host device, and stores in its record or table for this user or application the key ID for the key value used to encrypt the data to be written. It then encrypts the data and stores the encrypted data at the addresses designated by the host as well as the key value it generated.

When a user or application requests to read encrypted data from memory 20, it will need to provide its identity and credential, the key ID for the key previously used to encrypt the requested data, and the logical addresses where the encrypted data is stored. System 10 will then match the user or application identity and credential provided by the host to those stored in its record. If they match, system 10 will then fetch from its memory the key value associated with the key ID provided by the user or application, decrypt the data stored at the addresses designated by the host device using the key value and send the decrypted data to the user or application.

By separating the authentication credentials from the management of keys used for cryptographic processing, it is then possible to share rights to access data without sharing credentials. Thus, a group of users or applications with different credentials can have access to the same keys for accessing the same data, while users outside this group have no access. While all users or applications within a group may have access to the same data, they may still have different rights. Thus, some may have read only access, while others may have write access only, while still others may have both. Since system 10 maintains a record of the users or application identities and credentials, the key IDs they have access to, and the associated access rights to each of the key IDs, it is possible for system 10 to add or delete key IDs and alter access rights associated with such key IDs for particular users or applications, to delegate access rights from one user or application to another, or even to delete or add records or tables for users or applications, all as controlled by a properly authenticated host device. The record stored may specify that a secure channel is required for accessing certain keys. Authentication may be done using symmetric or asymmetric algorithms as well as passwords.

Especially important is the portability of the secured content in the memory system 10. Since the key value is generated by the memory system and substantially not available to external systems, when the memory system or a storage device incorporating the system is transferred from one external system to another, security of the content stored therein is maintained, and external systems are not able to access such content unless they have been authenticated in a manner completely controlled by the memory system. Even after being so authenticated, access is totally controlled by the memory system, and external systems can access only in a manner controlled according to preset records in the memory system. If a request does not comply with such records, the request will be denied.

Figure 2:
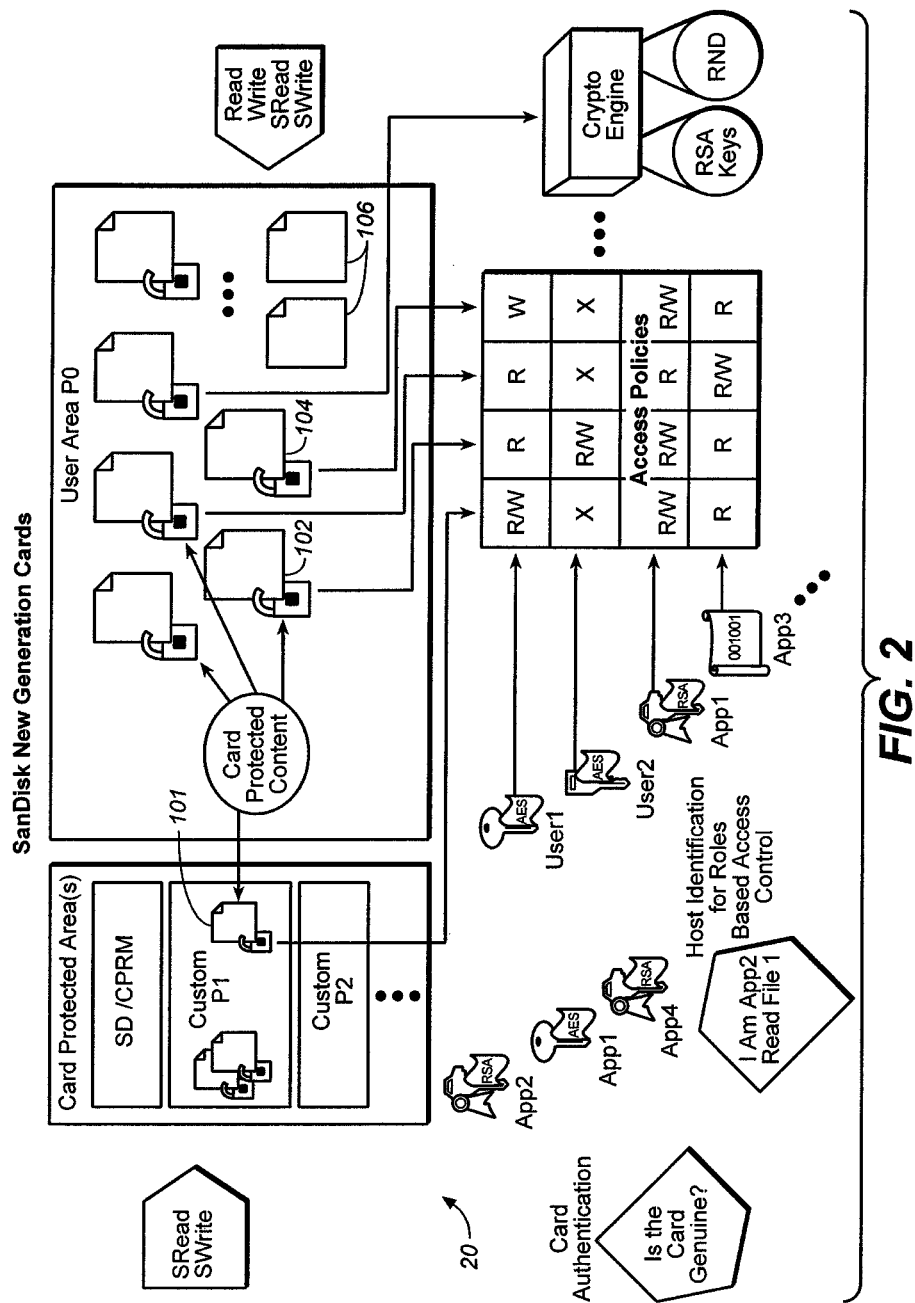
FIG. 2 is a schematic view of different partitions of a memory and of unencrypted and encrypted files stored in different partitions where access to certain partitions and the encrypted files is controlled by access policies and authentication procedures to illustrate an embodiment of the invention.

To provide greater flexibility in protecting content, it is envisioned that certain areas of the memory referred to below as partitions can be accessed only by properly authenticated users or applications. When combined with the above described features of key-based data encryption, system 10 provides greater data protection capability. As shown in FIG. 2, the flash memory 20 may have its storage capacity divided into a number of partitions: a user area or partition and custom partitions. The user area or partition P0 is accessible to all users and applications without authentication. While all bit values of data stored in the user area can be read or written to by any application or user, if the data read is encrypted, the user or application without authority to decrypt would not be able to access the information represented by the bit values stored in a user area. This is illustrated, for example, by files 102 and 104 stored in user area P0. Also stored in the user area are unencrypted files such as 106 which can be read and understood by all applications and users. Thus, symbolically, the files that are encrypted are shown with locks associated with them such as for files 102 and 104.

While an encrypted file in a user area P0 cannot be understood by unauthorized applications or users, such applications or users may still be able to delete or corrupt the file, which may be undesirable for some applications. For this purpose, memory 20 also includes protected custom partitions such as partitions P1 and P2 which cannot be accessed without prior authentication. The authentication process permitted in the embodiments in this application is explained below.

As also illustrated in FIG. 2, a variety of users or applications may access the files in memory 20. Thus users 1 and 2, and applications 1-4 (running on devices) are shown in FIG. 2. Before these entities are allowed to access protected content in memory 20, they are first authenticated by an authentication process in a manner explained below. In this process, the entity that is requesting access needs to be identified at the host side for role based access control. Thus, the entity requesting access first identifies itself by supplying information such as "I am application 2 and I wish to read file 1." Controller 12 then matches the identity, authentication information and request against the record stored in memory 20 or controller 12. If all requirements are met, access is then granted to such entity. As illustrated in FIG. 2, user 1 is allowed to read from and write to file 101 in partition P1, but can only read files 102 and 104 in addition to user 1 having unrestricted rights to read from and write to files 106 in P0. User 2, on the other hand, is not allowed access to file 101 and 104 but has read and write access to file 102. As indicated in FIG. 2, users 1 and 2 have the same login algorithm (AES) while applications 1 and 3 have different login algorithms (e.g. RSA and 001001) which are also different from those of users 1 and 2.

The Secure Storage Application (SSA) is a security application of the memory system 10, and illustrates an embodiment of the invention, which can be used to implement many of the above-identified features. SSA may be embodied as software or computer code with database stored in the memory 20 or a non-volatile memory (not shown) in CPU 12, and is read into RAM 12a and executed by CPU 12. The acronyms used in reference to the SSA are set forth in the table below:

| Definitions, Acronyms & Abbreviations | |
| --- | --- |
| ACR | Access Control Records |
| AGP | ACR Group |
| CBC | Chain Block Cipher |
| CEK | Content Encryption Key |
| ECB | Electronic Codebook |
| ACAM | ACR Attributes Management |
| PCR | Permissions Control Record |
| SSA | Secure Storage Application |
| Entity | Any thing that has real and individual existence (host side) that logs in the SSA and thus utilizes its functionalities. |

SSA System Description

Data security, integrity and access control are the major roles of the SSA. The data are files that would otherwise be stored plainly on a mass-storage device of some kind. The SSA system sits atop of the storage system and adds the security layer for the stored host files.

The main task of the SSA is to manage the different rights associated with the stored (and secured) content in the memory. The memory application needs to manage multiple users and content rights to multiple stored content. Host applications from their side, see drives and partitions that are visible to such applications, and file allocation tables (FATs) that manage and portray the locations of the stored files on the storage device.

In this case the storage device uses NAND flash chip divided to partitions, although other mobile storage devices may also be used and are within the scope of this invention. These partitions are continuous threads of logical addresses, where a start and an end address define their boundaries. Restrictions may therefore be imposed on access to hidden partitions, if desired, by means of software (such as software stored in memory 20) that associates such restrictions with the addresses within such boundaries. Partitions are fully recognizable to the SSA by their logical address boundaries that are managed by it. The SSA system uses partitions to physically secure data from unauthorized host applications. To the host, the partitions are a mechanism of defining proprietary spaces in which to store data files. These partitions can either be public, where anyone with access to the storage device can see and be aware of the partition's presence on the device, or private or hidden, where only the selected host applications have access to and are aware of their presence in the storage device.

Figure 3:
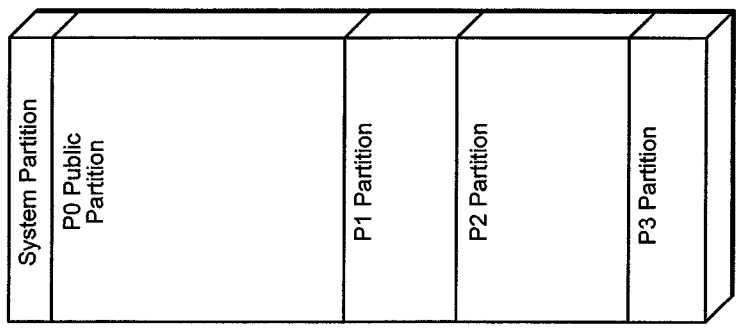
FIG. 3 is a schematic view of a memory illustrating the different partitions in the memory.

FIG. 3 is a schematic view of a memory illustrating the partitions of the memory: P0, P1, P2 and P3 (obviously fewer or more partitions than four may be employed), where P0 is a public partition which can be accessed by any entity without authentication.

A private partition (such as P1, P2 or P3) hides the access to the files within it. By preventing the host from accessing the partition, the flash device (e.g. flash card) delivers protection of the data files inside the partition. This kind of protection, however, engulfs all of the files residing in the hidden partition by imposing restrictions on access to data stored at the logical addresses within the partition. In other words, the restrictions are associated with a range of logical addresses. All of the users/hosts that have access to that partition will have unlimited access to all of the files inside. To isolate different files from one another—or groups of files—the SSA system provides another level of security and integrity per file—or groups of files—using keys and key references or Key IDs. A key reference or key ID of a particular key value used for encrypting data at different memory addresses can be analogized to a container or domain that contains the encrypted data. For this reason, in FIG. 4, the key references or key IDs (e.g. "key 1" and "key 2") are shown graphically as areas surrounding the files encrypted using the key values associated with the key IDs.

Figure 4:
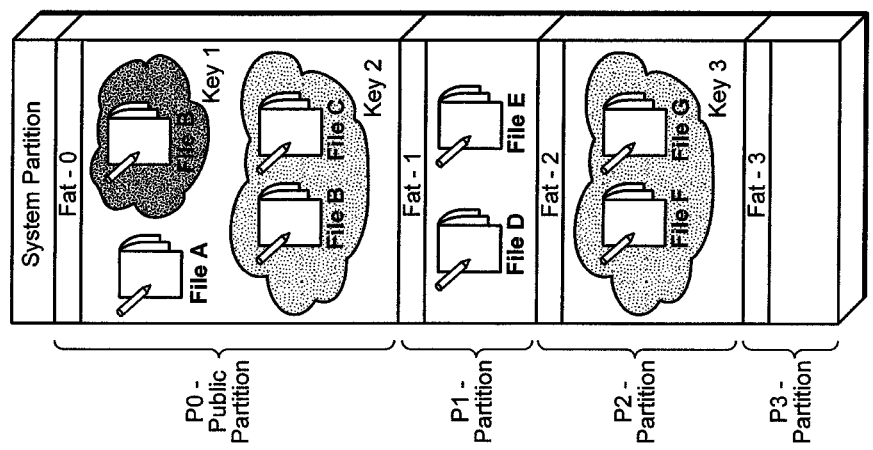
FIG. 4 is a schematic view of file location tables for the different partitions of the memory shown in FIG. 3 where some of the files in the partitions are encrypted to illustrate an embodiment of the invention.

In reference to FIG. 4, for example, File A is accessible to all entities without any authentication, since it is shown as not enclosed by any key ID. Even though File B in the public partition can be read or overwritten by all entities, it contains data encrypted with a key with ID "key 1", so that the information contained in File B is not accessible to an entity unless such entity has access to such key. In this manner using key values and key references or Key IDs provide logical protection only, as opposed to the type of protection provided by the partition described above. Hence, any host that can access a partition (public or private) is capable of reading or writing the data in the entire partition, including the encrypted data. However, since the data is encrypted, unauthorized users can only corrupt it. They preferably cannot alter the data without detection or use it. By restricting the access to the encryption and/or decryption keys, this feature can allow only the authorized entities to use the data. Files B and C are also encrypted using a key with key ID "key 2" in P0.

Data confidentiality and integrity can be provided through symmetric encryption methods that use Content Encryption Keys (CEK), one per CEK. In the SSA embodiment, the CEKs are generated by the flash device (e.g. flash card), used internally only, and kept as secrets from the outside world. The data that is encrypted or ciphered may also be either hashed or the cipher is chain blocked to ensure data integrity.

Not all the data in the partition is encrypted by different keys and associated with different key IDs. Certain logical addresses either in public or user files or in the operating system area (i.e. FAT) may not be associated with any key or key reference, and thus are available to any entity that can access the partition itself.

An entity that calls for the ability to create keys and partitions as well as writing and reading data from them or using the keys, needs to login to the SSA system through an Access Control Record (ACR). The privileges of an ACR in the SSA system are called Actions. Every ACR may have Permissions to perform Actions of the following three categories: Creating partitions and keys/key IDs, accessing partitions and keys and creating/updating other ACRs.

ACRs are organized in groups called ACR Groups or AGPs. Once an ACR has successfully authenticated, the SSA system opens a Session through which any of the ACR's actions can be executed.

User Partition(s)

The SSA system manages one or more public partitions, also referred to as the user partition(s). This partition exists on the storage device and is a partition or partitions that can be accessed through the standard read write commands of the storage device. Getting information regarding the size of the partition(s) as well as its existence on the device preferably cannot be hidden from the host system.

The SSA system enables accessing this partition(s) either through the standard read write commands or the SSA commands. Therefore, accessing the partition preferably cannot be restricted to specific ACRs. The SSA system, however, can enable the host devices to restrict the access to the user partition. Read and write accesses can be enabled/disabled individually. All four combinations (e.g. write only, read only (write protect), read and write and no access) are allowed.

The SSA system enables ACRs to associate key IDs with files within the user partition and encrypt individual files using keys associated with such key IDs. Accessing encrypted files within the user partitions as well as setting the access rights to the partitions will be done using the SSA command set (refer to Appendix A for detailed description of the SSA commands—In the Appendix, key ID is referred to as "domain").The above features also apply to data not organized into files.

SSA Partitions

These are hidden (from the host operating system or OS) partitions that can be accessed only through the SSA commands. The SSA system will preferably not allow the host device to access an SSA partition, other than through a session (described below) established by logging onto an ACR. Similarly, preferably the SSA will not provide information regarding the existence, size and access permission of an SSA partition, unless this request is coming through an established session.

Access rights to partitions are derived from the ACR permissions. Once an ACR is logged into the SSA system, it can share the partition with other ACRs (described below). When a partition is created, the host provides a reference name or ID (e.g. P0-P3 in FIGS. 3 and 4) for the partition. This reference is used in further read and write commands to the partition.

Partitioning of the Storage Device

All available storage capacity of the device is preferably allocated to the user partition and the currently configured SSA partitions. Therefore, any repartition operation may involve reconfiguration of the existing partitions. The net change to the device capacity (sum of sizes of all partitions) will be zero. The IDs of the partitions in the device memory space are defined by the host system.

The host system can either repartition one of the existing partitions into two smaller ones or, merge two existing partitions (which may or may not be adjacent) into one. The data in the divided or merged partitions can be either erased or left untouched, at the host's discretion.

Since repartitioning of the storage device may cause loss of data (either because it was erased or moved around in the logical address space of the storage device) severe restrictions on repartitioning are administered by the SSA system. Only an ACR residing in a root AGP (explained below) is allowed to issue a repartition command and it can only reference partitions owned by it. Since the SSA system is not aware of how data is organized in the partitions (FAT or other file system structure) it is the host's responsibility to reconstruct these structures any time the device is repartitioned.

Repartitioning of the user partition will change the size and other attributes of this partition as seen by the host OS.

After repartitioning, it is the host system's responsibility to make sure any ACR in the SSA system is not referencing the non-existing partitions. If these ACRs are not deleted or updated appropriately, future attempts, on behalf of these ACRs, to access the non-existing partitions will be detected and rejected by the system. Similar care is taken, regarding deleted keys and key IDs.

Keys, Key IDs and Logical Protection

When a file is written to a certain hidden partition, it is hidden from the general public. But, once an entity (hostile or not) gets knowledge and access to this partition the file becomes available and plain to see. To further secure the file, the SSA can encrypt it in the hidden partition, where the credentials for accessing the key for decrypting the file are preferably different from those for accessing the partition. Due to the fact that files are not something that the SSA is aware of (totally controlled and managed by the host), associating a CEK with a file is a problem. Linking the file to something the SSA acknowledges—the key ID, rectifies this. Thus, when a key is created by the SSA, the host associates the key ID for this key with the data encrypted using the key created by the SSA.

The key value and key ID provide logical security. All data associated with a given key ID, regardless of its location, is ciphered with the same content encryption key (CEK) whose reference name or key ID is uniquely provided at creation by the host application. If an entity obtains access to a hidden partition (by authenticating through an ACR) and wishes to either read or write an encrypted file within this partition, it needs to have access to the key ID that is associated with the file. When granting access to the key for this key ID, the SSA loads the key value in CEK associated with this key ID and either decrypts the data before sending it to the host or encrypts the data before writing it to the flash memory 20. A key value in CEK associated with a key ID is randomly created once by the SSA system and maintained by it. No one outside the SSA system has knowledge or access to this key value in CEK. The outside world only provides and uses a reference or key ID, not the key value in CEK. The key value is entirely managed and only accessible by the SSA The SSA system protects the data associated with the key ID using any one (user defined) of the following cipher modes (the actual cryptographic algorithms used, as well as the key values in CEKs, are system controlled and not revealed to the outside world):

Block mode—Data is divided into blocks, each one of them, encrypted individually. This mode is generally considered less secure and susceptive to dictionary attacks, However, it will allow users to randomly access any one of the data blocks.

Chained mode—Data is divided into blocks, which are chained during the encryption process. Every block is used as one of the inputs to the encryption process of the next one. This mode, although considered as more secure, requires that the data is always written and read sequentially from start to end, creating an overhead not always acceptable to the users.

Hashed—Chain mode with the additional creation of a data digest that can be used for validating data integrity.

ACRs and Access Control

The SSA is designed to handle multiple applications where each one of them is represented as a tree of nodes in the system database. Mutual exclusion between the applications is achieved by ensuring no cross talk between the tree branches.

In order to gain access to the SSA system, an entity needs to establish a connection via one of the system's ACRs. Login procedures are administered by the SSA system according to the definitions embedded in the ACR the user chose to connect with.

Figure 5:
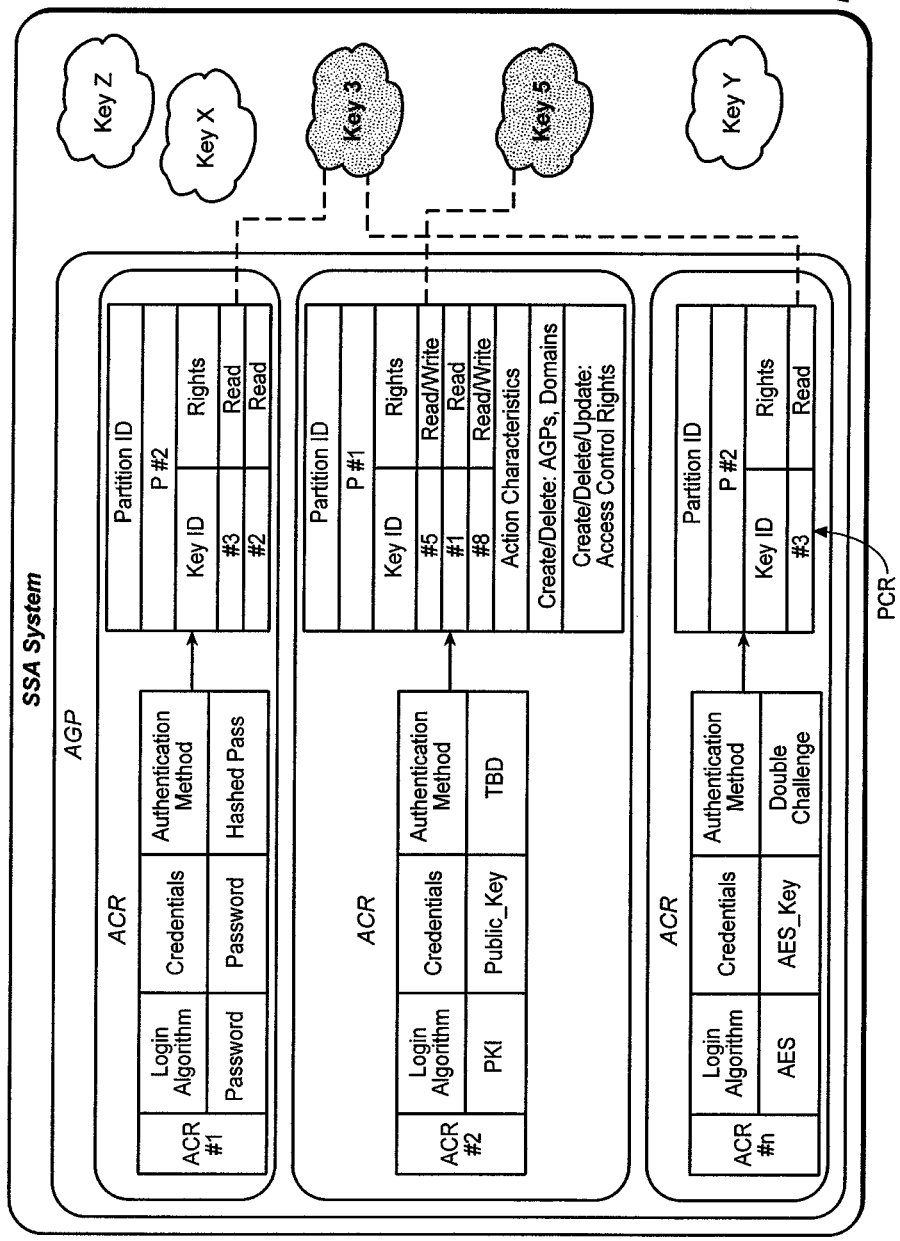
FIG. 5 is a schematic view of access control records in an access controlled record group and the associated key references to illustrate an embodiment of the invention.

The ACR is an individual login point to the SSA system. The ACR holds the login credentials and the authentication method. Also residing in the record are the login permissions within the SSA system, among which are the read and write privileges. This is illustrated in FIG. 5, which illustrates n ACRs in the same AGP. This means that at least some of the n ACRs may share access to the same key. Thus, ACR #1 and ACR #n share access to a key with key ID "key 3", where ACR#1 and ACR#n are the ACR IDs, and "key 3" is a key ID for the key that is used to encrypt data associated with "key 3". The same key can also be used to encrypt and/or decrypt multiple files, or multiple sets of data.

The SSA system supports several types of login onto the system where authentication algorithms and user credentials may vary, as may the user's privileges in the system once he logged in successfully. FIG. 5 again illustrates different login algorithms and credentials. ACR#1 requires a password login algorithm and password as credential whereas ACR#2 requires a PKI (public key infrastructure) login algorithm and public key as credential. Thus, to login, an entity will need to present a valid ACR ID, as well as the correct login algorithm and credential.

Once an entity is logged into an ACR of the SSA system, its permissions—its rights to use SSA commands—are defined in the Permissions Control Record (PCR) which is associated with the ACR. In FIG. 5, ACR#1 grants read only permission to data associated with "key 3", and ACR #2 grants permission to read and write data associated with "key 5" according to the PCR shown.

Different ACRs may share common interests and privileges in the system such as in keys with which to read and write. To accomplish that, ACRs with something in common are grouped in AGPs-ACR. Groups. Thus, ACR #1 and ACR #n share access to a key with key ID "key 3".

Figure 6:
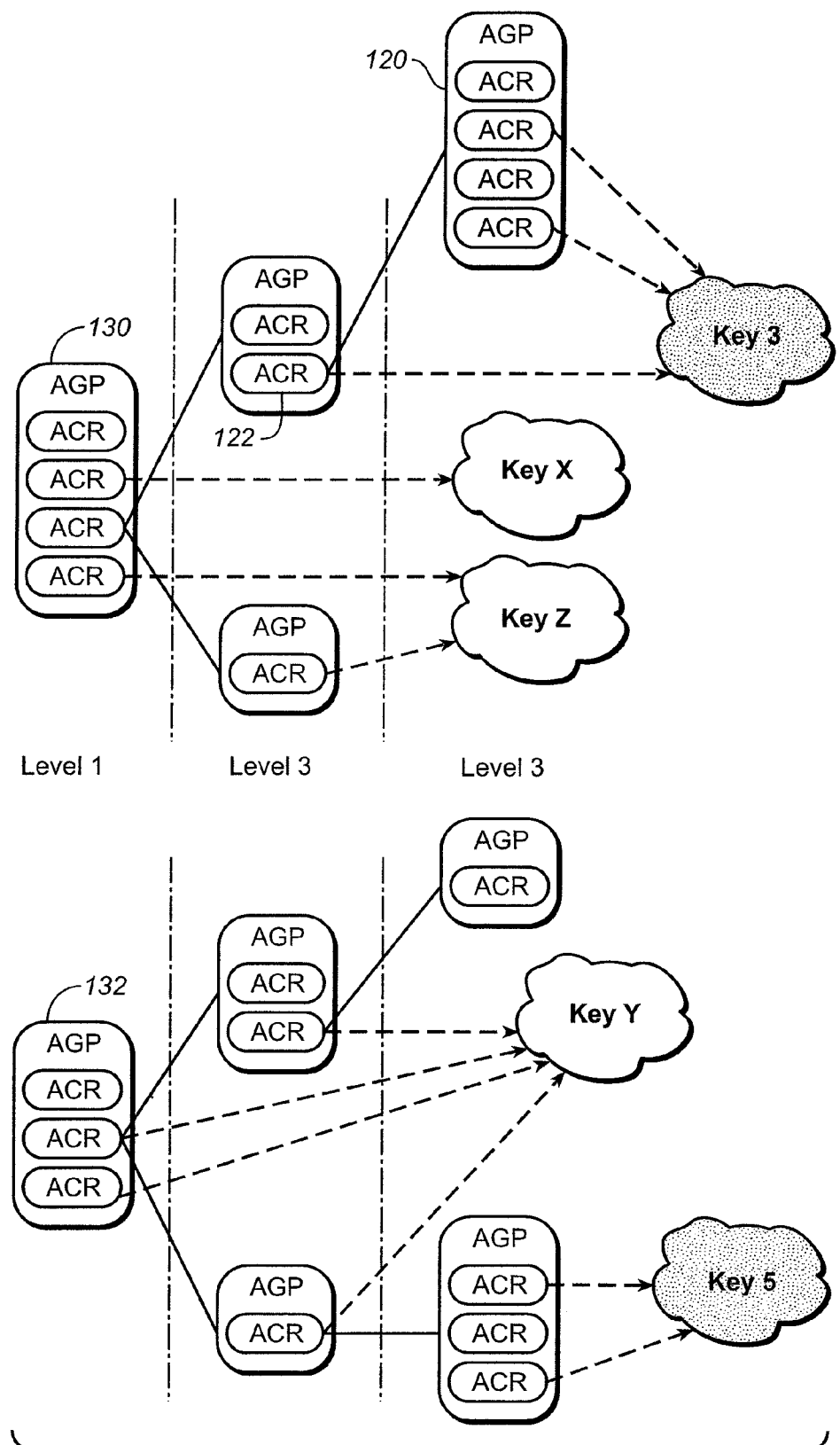
FIG. 6 is a schematic view of tree structures formed by access controlled records groups and access controlled records to illustrate an embodiment of the invention.

AGPs and, the ACRs within, are organized in hierarchical trees and so aside from creating secure keys that keep sensitive data secure; an ACR can preferably also create other ACR entries that correspond to his key ID/partitions. These ACR children will have the same or less permissions as their father—creator and, may be given permissions for keys the father ACR himself created. Needless to add, the children ACRs get access permissions to any key that they create. This is illustrated in FIG. 6. Thus, all of the ACRs in AGP 120 were created by ACR 122 and two of such ACRs inherit from ACR 122 permission(s) to access to data associated with "key 3".

AGP

Logging onto the SSA system is done by specifying an AGP and an ACR within the AGP.

Every AGP has a unique ID (reference name), which is used as an index to its entry in the SSA database. The AGP name is provided to the SSA system, when the AGP is created. If the provided AGP name already exists in the system, the SSA will reject the creation operation.

AGPs are used to administer restrictions on delegation of access and management permissions as will be described in the following sections. One of the functions served by the two trees in FIG. 6 is to administer the access by entirely separate entities, such as two different applications, or two different computer users. For such purposes, it may be important for the two access processes to be substantially independent of one another (i.e. substantially no cross-talk), even though both occur at the same time. This means that the authentication, permissions as well as the creation of additional ACRs and AGPs in each tree are not connected to and do not depend on those of the other tree. Hence, when the SSA system is used in memory 10, this allows the memory system 10 to serve multiple applications simultaneously. It also allows the two applications to access two separate sets of data independently of one another (e.g. a set of photographs and a set of songs). This is illustrated in FIG. 6. Thus, the data associated with "keys 3", "key X" and "key Z" for the application or user accessing via nodes (ACRs) in the tree in the top portion of FIG. 6 may comprise photographs. The data associated with "key 5" and "key Y" for the application or user accessing via nodes (ACRs) of the tree in the bottom portion of FIG. 6 may comprise songs. The ACR that created the AGP has the permission to delete it only when the AGP is empty of ACR entries The Entity's SSA Entry Point: Access Control Record (ACR)

An ACR in the SSA system describes the way the entity is permitted to log into the system. When an entity logs into the SSA system it needs to specify the ACR that corresponds to the authentication process it is about to perform. An ACR includes a Permissions Control Record (PCR) that illustrates the granted actions the user can execute once authenticated as defined in the ACR as illustrated in FIG. 5. The host side entity provides all of the ACR data fields.

When an entity has successfully logged onto an ACR, the entity will be able to query on all of the ACR's partition and key access permissions and ACAM permissions (explained below).

ACR ID

When an SSA system entity initiates the login process it needs to specify the ACR ID (as provided by the host when the ACR was created) that corresponds to the login method so that the SSA will set up the correct algorithms and select the correct PCR when all login requirements have been met. The ACR ID is provided to the SSA system when the ACR is created.

Login/Authentication Algorithm

The authentication algorithm specifies what sort of login procedure will be used by the entity, and what kind of credentials are needed to provide proof of user's identity. The SSA system supports several standard login algorithms, ranging from no procedure (and no credential) and password-based procedures to a two-way authentication protocols based on either symmetric or asymmetric cryptography.

Credentials

The entity's credentials correspond to the login algorithm and are used by the SSA to verify and authenticate the user. An example for credential can be a password/PIN-number for password authentication, AES-key for AES authentication, etc. The type/format of the credentials (i.e. the PIN, the symmetric key, etc . . . ) is predefined and derived from the authentication mode; they are provided to the SSA system when the ACR is created. The SSA system has no part in defining, distributing and managing these credentials, with the exception of PKI based authentication where the device (e.g. flash card) can be used to generate the RSA key pair and the public key can be exported for certificate generation.

The Permissions Control Record (PCR)

The PCR shows what is granted to the entity after logging into the SSA system and passing the ACR's authentication process successfully. There are three types of permission categories: Creation permissions for partition and keys, Access permissions to partitions and keys and management permissions for Entity-ACR Attributes Accessing Partitions This section of the PCR contains the list of partitions (using their IDs as provided to the SSA system) the entity can access upon completing the ACR phase successfully. For each partition the access type may be restricted to write-only or read-only or may specify full write/read access rights. Thus, the ACR#1 in FIG. 5 has access to partition #2 and not partition #1. The restrictions specified in the PCR apply to the SSA partitions and the public partition.

The public partition can be accessed either by regular read and write commands to the device (e.g. flash card) hosting the SSA system, or by SSA commands. When a root ACR (explained below) is created with the permission to restrict the public partition, he can pass it on to his children. An ACR can preferably only restrict the regular read and write commands from accessing the public partition. ACRs in the SSA system can be restricted preferably only upon their creation. Once an ACR has the permission to read/write from/to the public partition, preferably it cannot be taken away.

Accessing Key IDs

This section of the PCR contains the data associated with the list of key IDs (as provided to the SSA system by the host) the entity can access when the ACR policies have been met by the entity's login process. The key ID specified is associated with a file/files that reside in the partition appearing in the PCR. Since the key IDs are not associated with logical addresses in the device (e.g. flash card), when more than one partition is associated with a specific ACR, the files can be in either one of the partitions. The key IDs specified in the PCR can have each, a different set of access rights. Accessing data pointed to by key IDs can be restricted to write-only or read-only or may specify full write/read access rights.

ACR Attributes Management (ACAM)

This section describes how in certain cases the ACR's system attributes can be changed.

The ACAM actions that may be permitted in the SSA system are:
 Create/delete/update AGPs and ACR.
 Create/delete Partitions and Keys.
 Delegate access rights to keys and partitions.

A father ACR preferably cannot edit ACAM permissions. This would preferably require the deletion and recreation of the ACR. Also the access permission to a key ID created by the ACR can preferably not be taken away.

Create/delete/update AGPs and ACR

An ACR may have the capacity to create other ACRs and AGPs. Creating ACRs also may mean delegating them some or all of the ACAM permissions possessed by their creator. Having the permission to create ACRs means having the permission for the following actions:

1. Define and edit the child's credentials—the authentication method preferably cannot be edited once set by the creating ACR. The credentials may be altered within the boundary of the authentication algorithm that is already defined for the child.

2. Delete an ACR.

3. Delegate the creating permission to the child ACR (thus having grandchildren).

An ACR with the permissions to create other ACRs has the permission to delegate the unblocking permission to ACRs it creates (although it probably does not have the permission to unblock ACRs). The father ACR will place in the child ACR a reference to his unblocker.

The father ACR is the only ACR that has the permission to delete his child ACR. When an ACR deletes a lower level ACR that he created, then all ACRs spawned by this lower-level ACR are automatically deleted as well. When an ACR is deleted then all the key IDs and partitions that it created are deleted.

There are two exceptions by which an ACR can update its own record:

Passwords/PINs, although set by the creator ACR, can be updated only by the ACR that includes them.

A root ACR may delete itself and the AGP that it resides in.

Delegate Access Rights to Keys and Partitions

ACRs and their AGPs are assembled in hierarchical trees where the root AGP and the ACRs within are at the top of the tree (e.g. root AGPs 130 and 132 in FIG. 6). There can be several AGP trees in the SSA system though they are totally separated from one another. An ACR within an AGP can delegate access permissions to its keys to all ACRs within the same AGP that it is in, and to all the ACRs created by them. The permission to create keys preferably includes the permission to delegate access permissions to use the keys.

Permissions to keys are divided into three categories:

1. Access—this defines the access permissions for the key i.e. Read, Write.

2. Ownership—an ACR that created a key is by definition its owner. This ownership can be delegated from one ACR to another (provided that they are in the same AGP or in a child AGP). An ownership of a key provides the permission to delete it as well as delegate permissions to it.

3. Access Rights Delegation—this permission enables the ACR to delegate the rights he holds.

An ACR can delegate access permissions to partitions he created as well as other partitions he has access permissions to.

The permission delegation is done by adding the names of the partitions and key IDs to the designated ACR's PCR. Delegating key access permissions may either be by the key ID or by stating that access permission is for all of the created keys of the delegating ACR.

Blocking and Unblocking of ACRs

An ACR may have a blocking counter which increments when the entity's ACR authentication process with the system is unsuccessful. When a certain maximum number (MAX) of unsuccessful authentications is reached, the ACR will be blocked by the SSA system.

The blocked ACR can be unblocked by another ACR, referenced by the blocked ACR. The reference to the unblocking ACR is set by its creator. The unblocking ACR preferably is in the same AGP as the creator of the blocked ACR and has the "unblocking" permission.

No other ACR in the system can unblock the blocked ACR. An ACR may be configured with a blocking counter but without an unblocker ACR. In this case, if this ACR get blocked it cannot be unblocked.

Root AGP—Creating an Application Database

The SSA system is designed to handle multiple applications and isolate the data of each one of them. The tree structure of the AGP system is the main tool used to identify and isolate application specific data. The root AGP is at the tip of an application SSA database tree and adheres to somewhat different behavior rules. Several root AGPs can be configured in the SSA system. Two root AGPs 130 and 132 are shown in FIG. 6. Obviously fewer or more AGPs may be used and are within the scope of this invention.

Registering the device (e.g. flash card) for a new application and/or issue credentials of a new applications for the device are done through the process of adding new AGP/ACR tree to the device.

The SSA system supports three different modes of root AGP creation (as well as all of the ACRs of the root AGP and their permissions):

1. Open: Any user or entity without requiring any sort of authentication, or users/entities authenticated through the system ACR (explained below), can create a new root AGP. The open mode enables creation of root AGPs either without any security measures while all data transfer is done on an open channel (i.e. in the secure environment of an issuance agency) or, through a secure channel established through the system ACR authentication (i.e. Over The Air (OTA) and post issuance procedures).

If the system ACR is not configured (this is an optional feature) and the root AGP creation mode is set to Open, only the open channel option is available.

2. Controlled: Only entities authenticated through the System ACR can create a new root AGP. The SSA system cannot be set to this mode if system ACR is not configured.

3. Locked: Creation of root AGPs is disabled and no additional root AGPs can be added to the system Two SSA commands control this feature (these commands are available to any user/entity without authentication):

1. Method configuration command—Used to configure the SSA system to use any one of the three root AGP creation modes. Only the following mode changes are allowed: Open->Controlled, Controlled->Locked (i.e. if the SSA system is currently configured as Controlled, it can only be changed to locked).

2. Method configuration lock command—Used to disable the method configuration command and permanently lock the currently selected method.

When a root AGP is created, it is in a special initializing mode that enables the creation and configuration of its ACRs (using the same access restrictions that applied to the creation of the root AGP). At the end of the root AGP configuration process, when the entity explicitly switches it to operating mode, the existing ACRs can no longer be updated and additional ACRs can no longer be created Once a root AGP is put in standard mode it can be deleted only by logging into the system through one of its ACRs that is assigned with the permission to delete the root AGP. This is another exception of root AGP, in addition to the special initialization mode; it is preferably the only AGP that may contain an ACR with the permission to delete its own AGP, as opposed to AGPs in the next tree level.

The third and last difference between a root ACR and a standard ACR is that it is the only ACR in the system that can have the permission to create and delete partitions.

SSA System ACR

The system ACR may be used for the following two SSA operations:

1. Create an ACR/AGP tree under the protection of a secured channel within hostile environments.

2. Identify and authenticate the device hosting the SSA system.

There may preferably be only one System ACR in the SSA and once defined it preferably cannot be changed. There is no need for system authentication when creating the System ACR; only a SSA command is needed. The create-system-ACR feature can be disabled (similarly to the create-root- AGP feature). After the system ACR is created, the create-system-ACR command has no effect, since preferably only one System ACR is allowed.

While in the process of creating, the System ACR is not operational. Upon finishing, a special command needs to be issued indicating that the System ACR is created and ready to go. After this point the System ACR preferably cannot be updated or replaced.

Figure 7:
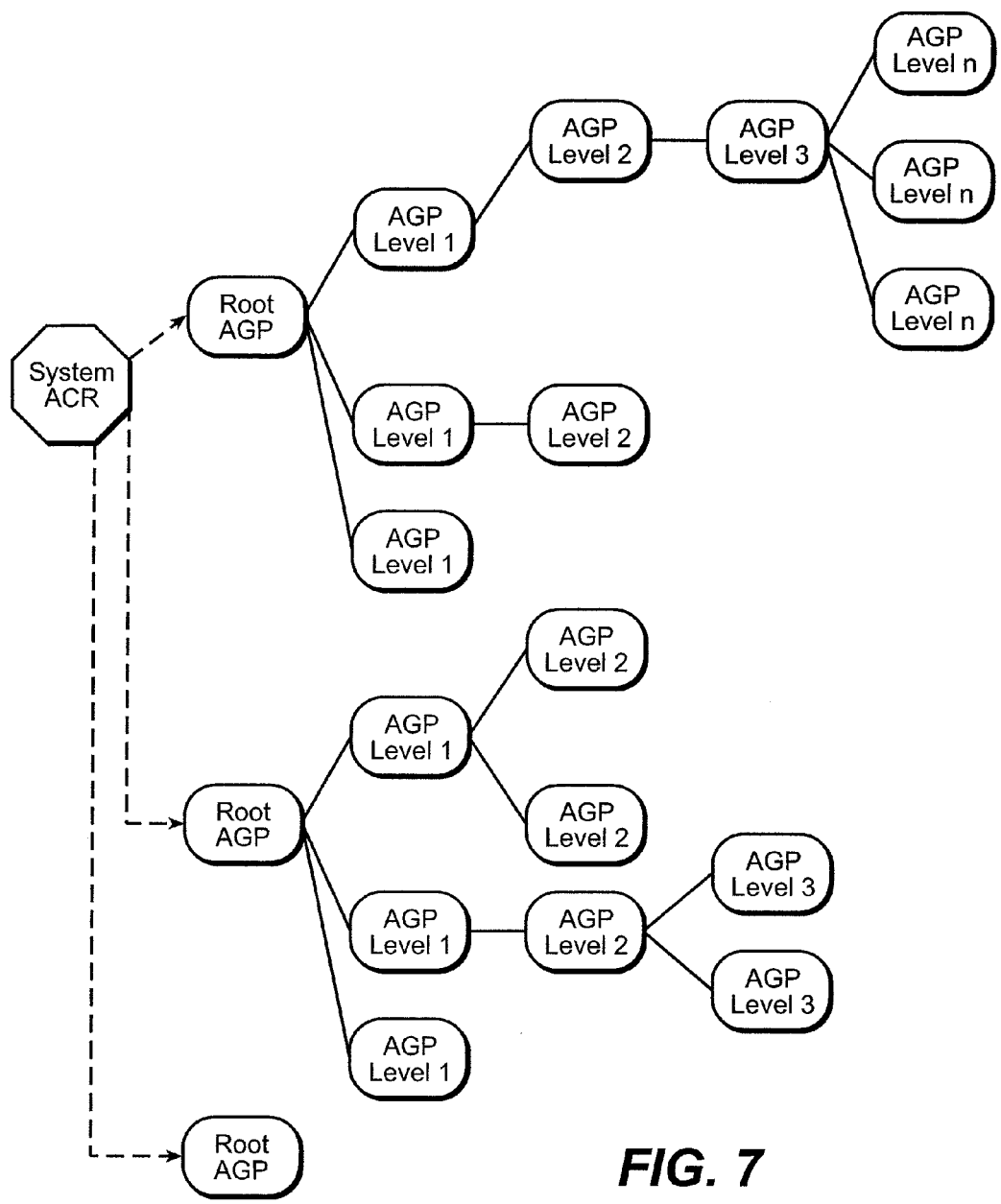
FIG. 7 is a schematic diagram of a tree illustrating three hierarchical trees of access controlled record groups to illustrate a process of formation of the trees.
Figure 8A:
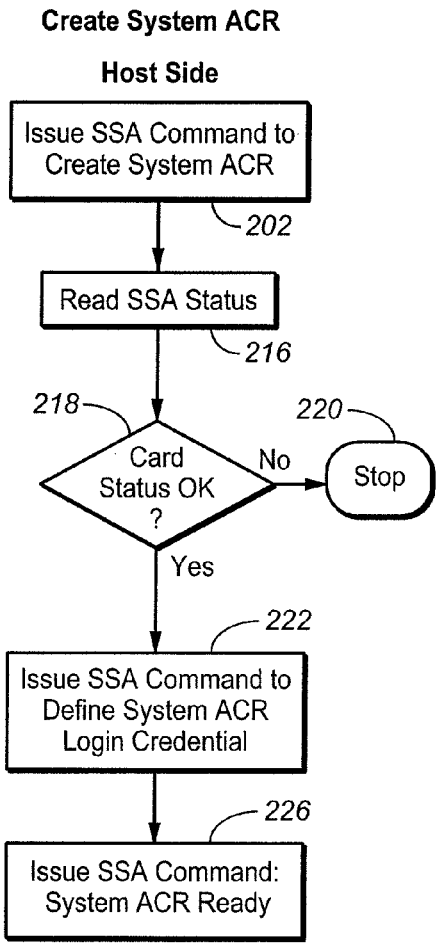
FIGS. 8A and 8B are flow charts illustrating the processes carried out by a host device and a memory device such as a memory card for creating and using a system access control record.
Figure 8B:
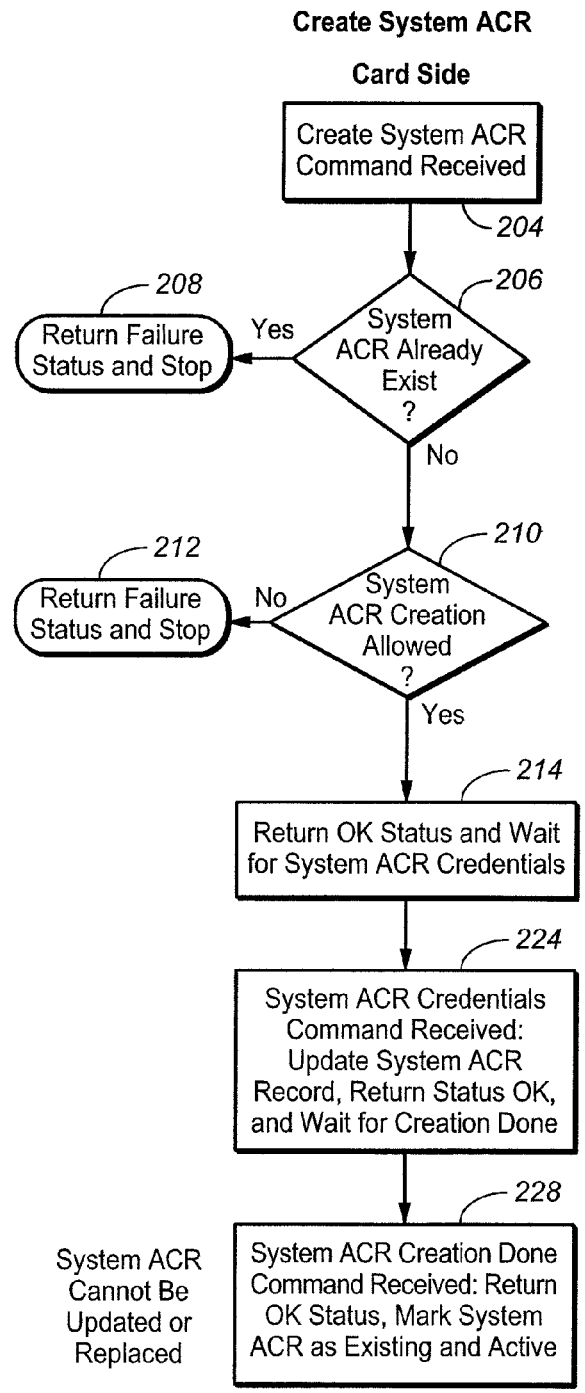

The System ACR creates the root ACR/AGP in the SSA. It has permission to add/change the root level until such time that the host is satisfied with it and blocks it. Blocking the root AGP essentially cuts off its connection to the system ACR and renders it temper proof. At this point no one can change/edit the root AGP and the ACRs within. This is done through an SSA command. Disabling creation of root AGPs has a permanent effect and cannot be reversed. The above features involving the system ACR are illustrated in FIG. 7. The system ACR is used to create three different root AGPs. At a certain time after these are created, the SSA command is sent from the host to block the root AGPs from the system ACR, thereby disabling the create-root-AGP feature, as indicated by the dotted lines connecting the System ACR to the root AGPs in FIG. 7. This renders the three root AGPs temper proof. The three root AGPs may be used to create children AGPs to form three separate trees, before or after the root AGPs are blocked.

The above described features provides great flexibility to the content owner in configuring secure products with content. Secure products need to be "Issued". Issuance is the process of putting identification keys by which the device can identify the host and vice versa. Identifying the device (e.g. flash card) enables the host to decide whether it can trust its secrets with it. On the other hand, identifying the host enables the device to enforce security policies (grant and execute a specific host command) only if the host is allowed to.

Products that are designed to serve multiple applications will have several identification keys. The product can be "pre-issued"—keys stored during manufacturing before shipping, or "post issued"—new keys are added after shipping. For post issuance, the memory device (e.g. memory card) needs to contain some kind of master or device level keys which are being used to identify entities which are allowed to add applications to the device.

The above described features enables a product to be configured to enable/disable post issuance. In addition, the post issuance configuration can be securely done after shipping. The device may be bought as a retail product with no keys on it in addition to the master or device level keys described above, and then be configured by the new owner to either enable further post issuance applications or disable them.

Thus, the system ACR feature provides the capability to accomplish the above objectives:

Memory devices with no system ACR will allow unlimited and uncontrolled addition of applications.

Memory devices without system ACR can be configured to disable the system ACR creation, which means there is no way to control adding of new applications (unless the feature of creating new root AGP is disabled as well)

Memory devices with system ACR will allow only controlled addition of applications via a secure channel to establish through an authentication procedure using the system ACR credential.

Memory devices with system ACR may be configured to disable the application adding feature, before or after applications have been added.

Key ID List

Key IDs are created per specific ACR request; however, in the memory system 10, they are used solely by the SSA system. When a key ID is created the following data is provided by or to the creating ACR:

1. Key ID. The ID is provided by the entity through the host and is used to reference the key and data that is encrypted or decrypted using the key in all further read or write accesses.

2. Key Cipher and data integrity Mode (the Blocked, Chained and Hashed Modes above and as explained below)

In addition to the host provided attributes, the following data is maintained by the SSA system:

1. Key ID Owner. The ID of the ACR that is the owner. When a key ID is created the creator ACR is its owner. Key ID ownership may, however, be transferred to another ACR. Preferably only the key ID owner is allowed to transfer ownership of, and delegate, a key ID. Delegating access permission to the associated key, and revoking these rights can be administered either by the key ID owner or any other ACR assigned with delegation permissions. Whenever an attempt is made to exercise any one of these operations, the SSA system will grant it only if the requesting ACR is authorized.

2. CEK. This is the CEK used to cipher the content associated with or pointed to by the key ID. The CEK may be a 128 bit AES random key generated by the SSA system.

3. MAC and IV values. Dynamic information (message authentication codes and initiation vectors) used in the Chained Block Cipher (CBC) encryption algorithms.

The various features of the SSA are also illustrated in reference to the flow charts in FIGS. 8A-16, where 'H' to the left of a step means the operation is performed by the host, and 'C' means the operation is performed by the card. In order to create a System ACR, the host issues to the SSA in the memory device 10 a command to create System ACR (block 202). The device 10 responds by checking whether a System ACR already exists (block 204, diamond 206). If it already exists, then device 10 returns failure and stops (oblong 208). If it does not, then memory 10 checks to see if System ACR creation is allowed (diamond 210), and returns a failure status if not allowed (block 212). Thus, there may be instances where the device issuer does not allow the creation of a System ACR, such as in the case where the security features needed have been predetermined so that no System ACR is needed. If this is allowed, the device 10 returns OK status and waits for System ACR credentials from the host (block 214). The host checks the SSA status and whether the device 10 has indicated that the creation of a System ACR is allowed (block 216 and diamond 218). If creation is not allowed or if a system ACR already exists, the host stops (oblong 220). If the device 10 has indicated that the creation of a System ACR is allowed, the host issues a SSA command to define its login credential and sends it to the device 10 (block 222). The device 10 updates a System ACR record with the credential received and returns OK status (block 224). In response to this status signal, the host issues SSA command indicating the system ACR is ready (block 226). The device 10 responds by locking the System ACR so that it cannot be updated or replaced (block 228). This locks in the features of the system ACR and its identity for identifying the device 10 to the host.

Figure 9:
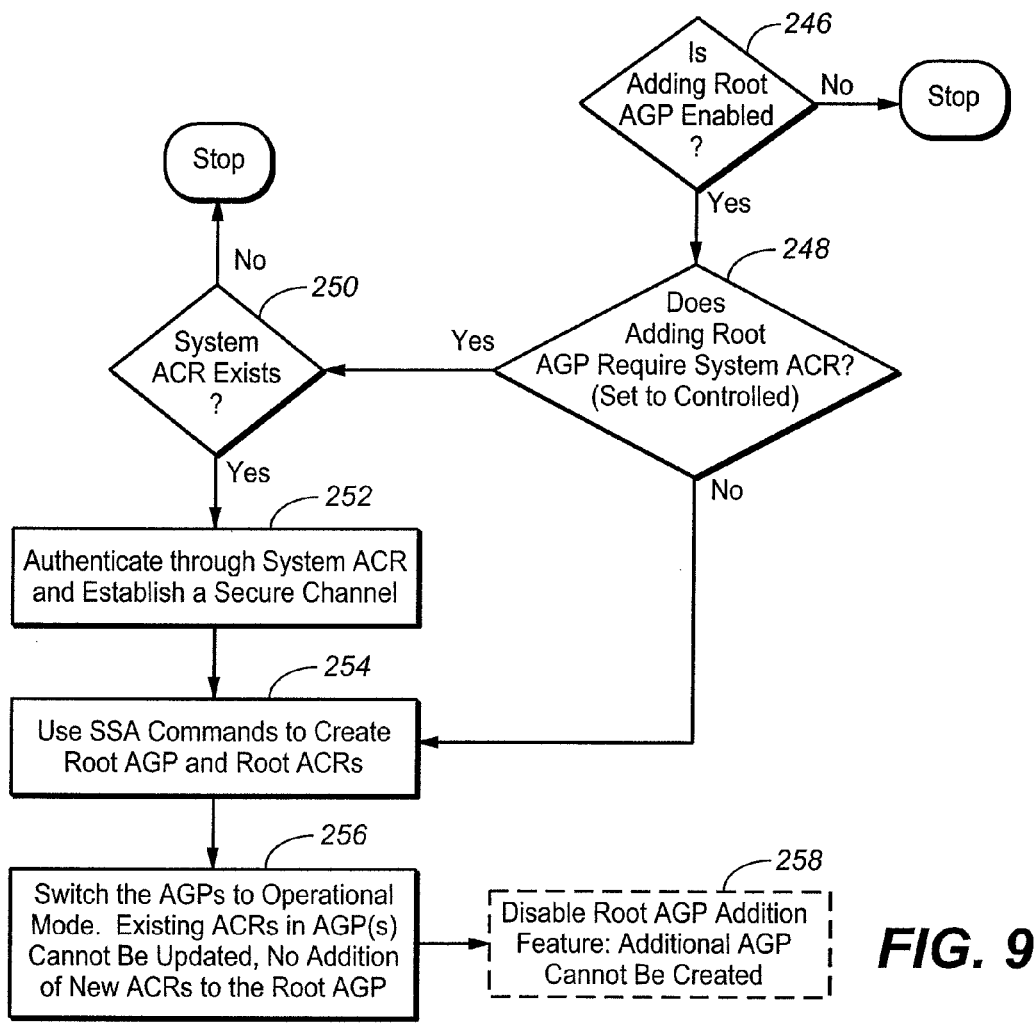
FIG. 9 is a flow chart illustrating a process using a system access control record to create an access controlled record group to illustrate the invention.

The procedure for creating new trees (New Root AGPs and ACR) is determined by the way these functions are configured in the device. FIG. 9 explains the procedures. Both the host 24 and the memory system 10 follow it. If adding new root AGP is disabled altogether, new root AGPs cannot be added (diamond 246). If it is enabled but requires a system ACR, the host authenticates through the system ACR and establishes a secure channel (diamond 250, block 252) prior to issuing the Create Root_AGP command (block 254). If system ACR is not required (diamond 248) the host 24 can issue the create root AGP command without authentication and proceed to block 254. If system ACR does exist, the host may use it even if it is not required (not shown in the flow chart). The device (e.g. flash card) will reject any attempt to create a new root AGP if the function is disabled and it will reject an attempt to create a new root AGP without authentication, if system ACR is required (diamonds 246 and 250). The newly created AGP and ACR in block 254, are now switched to Operational Mode so that the ACRs in such AGPs cannot be updated or otherwise changed, and no ACRs can be added to them (block 256). The system is then, optionally locked so that additional root AGPs cannot be created (block 258). The dotted line box 258 is a convention indicating that this step is an optional step. All the boxes in the flow charts of the figures of this application in dotted lines are optional steps. This allows the content owner to block the use of device 10 for other illicit purposes that may imitate a genuine memory device with legitimate content.

Figure 10:
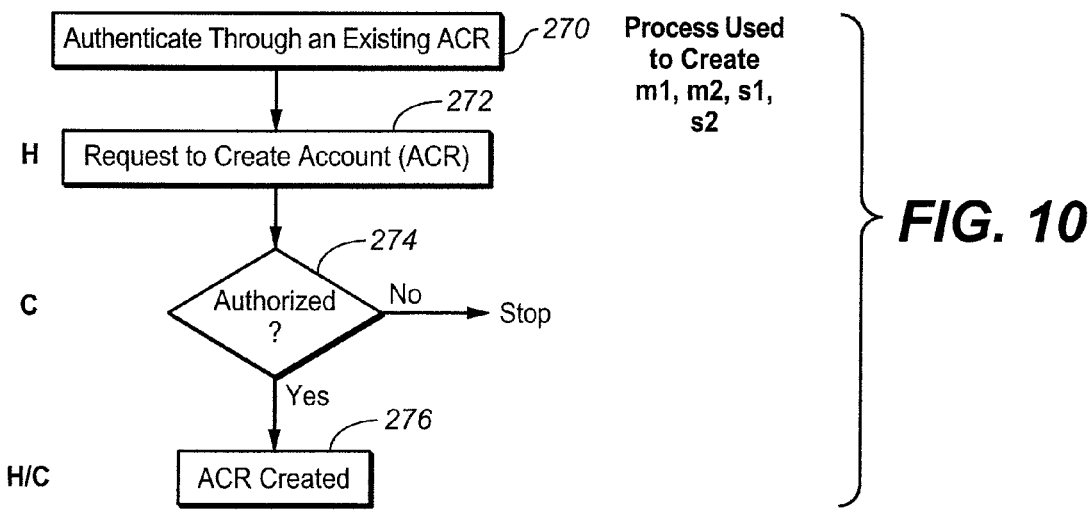
FIG. 10 is a flow chart illustrating a process for creating an access control record.

To create ACRs (other than the ACRs in the root AGP as described above), one may start with any ACR that has the right to create an ACR (block 270) as shown in FIG. 10. An entity may attempt to enter through the host 24 by providing the entry point ACR identity, and the ACR with all the necessary attributes that it wishes to create (block 272). The SSA checks for a match to the ACR identity and whether the ACR with such identity has the permission to create an ACR (diamond 274). If the request is verified to be authorized, the SSA in device 10 creates an ACR (block 276).

Figure 11:
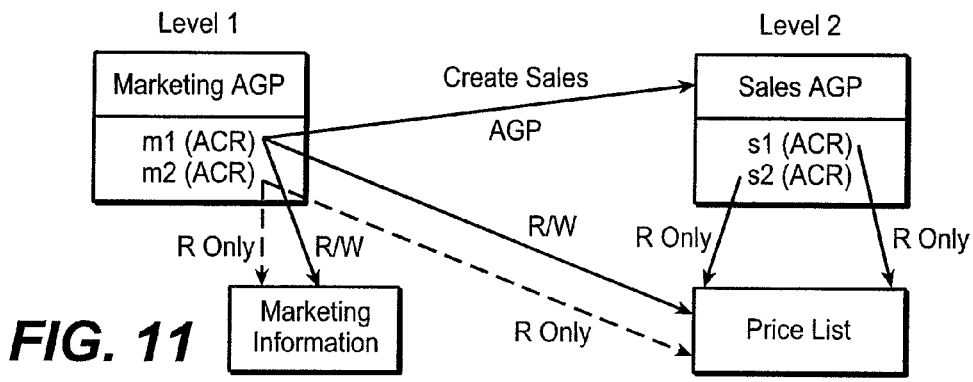
FIG. 11 is a schematic view of two access control record groups useful for illustrating a particular application of the hierarchical tree.

FIG. 11 shows two AGPs that illustrate a tree useful in security applications using the method of FIG. 10. Thus, the ACR with identity m1 in the marketing AGP has the permission to create an ACR. The ACR m1 also has the permission to use a key for reading and writing data associated with the key ID "Marketing Information" and data associated with the key ID "Price List". Using the method of FIG. 10, it creates the Sales AGP with two ACRs: s1 and s2 with only read permission to the key for accessing pricing data associated with the key ID "Price List", but not to the key necessary for accessing data associated with the key ID "Marketing Information". In this manner, the entities with the ACRs s1 and s2 can only read but not change the pricing data, and will have no access to marketing data. The ACR m2, on the other hand, has no permission to create ACRs, and has only read permission to the keys for accessing data associated with the key ID "Price List" and with the key ID "Marketing Information".

Figure 12:
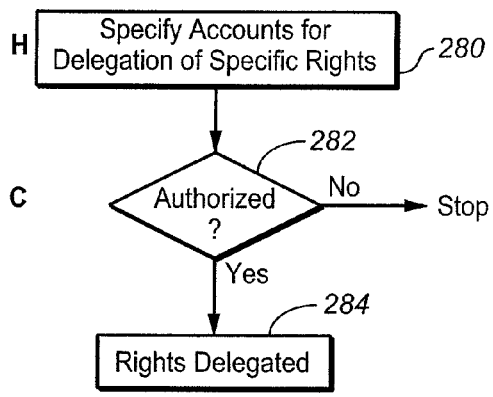
FIG. 12 is a flow chart illustrating a process for delegation of specific rights.
Figure 13:
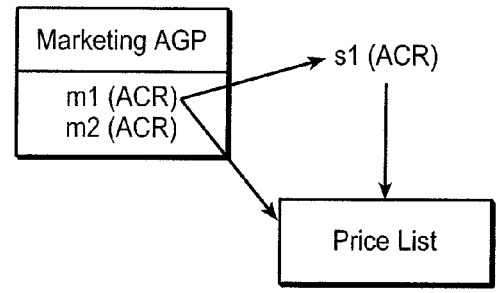
FIG. 13 is a schematic view of an access controlled record group and an access control record to illustrate the process of delegation of FIG. 12.

Thus, access rights may be delegated in the manner explained above where m1 delegates rights to read pricing data to s1 and s2. This is particularly useful where large marketing and sales groups are involved. Where there are but one or a few sales people, there may be no need to use the method of FIG. 10. Instead, the access rights may be delegated, by an ACR to one at a lower or the same level within the same AGP, as illustrated in FIG. 12. First, the entity enters the tree for such AGP by specifying an ACR in the manner described above in the tree through the host (block 280). Next the host will specify the ACR and the rights to delegate to. The SSA checks the tree(s) for such ACR and whether the ACR has the permission to delegate rights to the specified another ACR (diamond 282). If it does, the rights are delegated (block 284); if not it stops. The result is illustrated in FIG. 13. The ACR m1 in this case has the permission to delegate read permission to the ACR s1, so that s1 will be able to use a key to access pricing data after the delegation. This may be performed if m1 has the same or greater rights to access pricing data and the permission to so delegate. In one embodiment, m1 retains its access rights after the delegation. Preferably access rights may be delegated under restricted conditions (rather then permanently) such as for a limited time, limited number of accesses, etc. . . .

Figure 14:
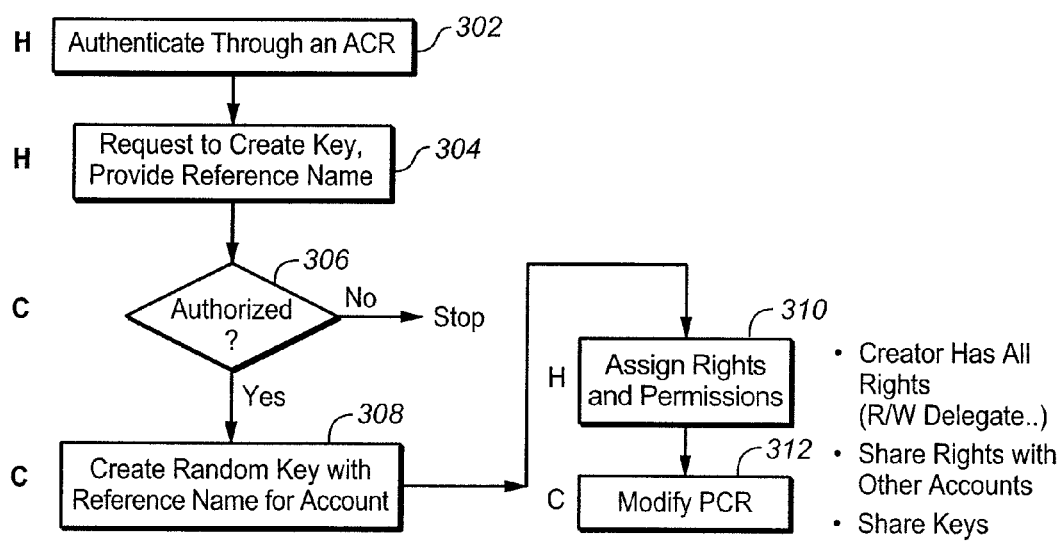
FIG. 14 is a flowchart illustrating the process for creating a key for the purpose of encryption and/or decryption.

The process for creating a key and key ID is illustrated in FIG. 14. The entity authenticates through an ACR (block 302). The entity requests the creation of a key with an ID specified by the host (block 304). The SSA checks and see if the ACR specified has the permission to do so (diamond 306). For example, if the key is to be used for accessing data in a particular partition, the SSA will check and see if the ACR may access such partition. If the ACR is authorized, then the memory device 10 creates a key value associated with the key ID provided by the host (block 308), ands stores the key ID in the ACR, and the key value in its memory (either in the controller-associated memory or memory 20) and assigns rights and permissions according to information supplied by the entity (block 310) and modifies the PCR of such ACR with such assigned rights and permissions (block 312). Thus, the creator of the key has all available rights, such as read and write permissions, right to delegate and share with other ACRs in the same AGP or an ACR at a lower level, and the right to transfer ownership of the key.

Figure 15:
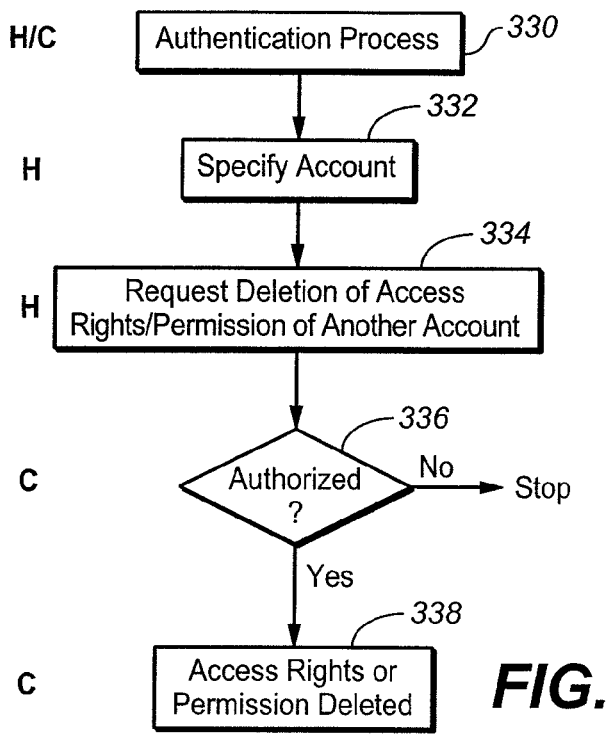
FIG. 15 is a flow chart illustrating a process for removing access rights and/or permission for data access according to an accessed controlled record.

An ACR can change the permissions (or the existence altogether) of another ACR in the SSA system as illustrated in FIG. 15. An entity may enter a tree through an ACR as before; in one case the entity is authenticated and then it specifies an ACR (blocks 330, 332). It requests the deletion of a target ACR or the permission in a target ACR (block 334). If the ACR specified or the one active at such time has the right to do so (diamond 336), the target ACR is deleted, or the PCR of the target ACR is altered to delete such permission (block 338). If this is not authorized the system stops.

Figure 16:
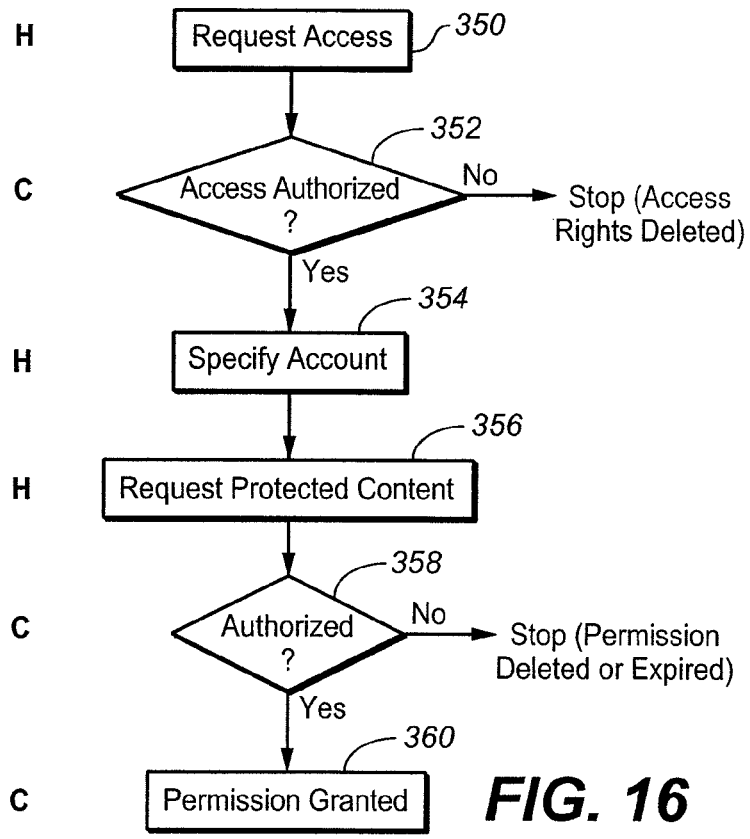
FIG. 16 is a flow chart illustrating a process for requesting access when access rights and/or permission to access has been deleted or has expired.

After the above described process, the target will no longer be able to access the data it was able to prior to the process. As shown in FIG. 16, an entity may attempt to enter at the target ACR (block 350) and finds that the authentication process fails, since the previously existing ACR ID is no longer present in the SSA, so that access rights are denied (diamond 352). Assuming that the ACR ID has not been deleted, the entity specifies an ACR (block 354) and the key ID and/or data in a particular partition (block 356), and the SSA then checks to see the key ID or partition access request is permitted according to the PCR of such ACR (diamond 358). If the permission has been deleted or has expired, then the request is again denied. Otherwise, the request is granted (block 360).

The above process describes how access to protected data is managed by the device (e.g. flash card), regardless of whether the ACR and its PCR were just changed by another ACR or were so configured to begin with.

Sessions

SSA system is designed to handle multiple users, logged in concurrently. This feature requires that every command received by the SSA is associated with a specific entity and executed only if the ACR, used to authenticate this entity, has the permissions for the requested action.

Multiple entities are supported through the session concept. A session is established during the authentication process and assigned a session-id by the SSA system. The session-id is internally associated with the ACR used for logging into the system and is exported to the entity to be used in all further SSA commands.

The SSA system supports two types of sessions: Open, and Secure sessions. The session type associated with a specific authentication process is defined in the ACR. The SSA system will enforce session establishment in a way similar to the way it enforces the authentication itself. Since the ACR defines the entity permissions, this mechanism enables system designers to associate secure tunneling either with accessing specific key IDs or invoking specific ACR management operations (i.e. creating new ACRs and setting credentials)

Open Session

Open session is a session identified with a session-id but without bus encryption, all commands and data are passed in the clear. This mode of operation is preferably used in a multi-user or multi-entity environment where the entities are not part of the threat model, nor is eavesdropping on the bus.

Although not protecting the transmission of the data nor enabling efficient fire-walling between the applications on the host side, the Open session mode enables the SSA system to allow access only to the information allowed for the currently authenticated ACRs.

Figure 17:
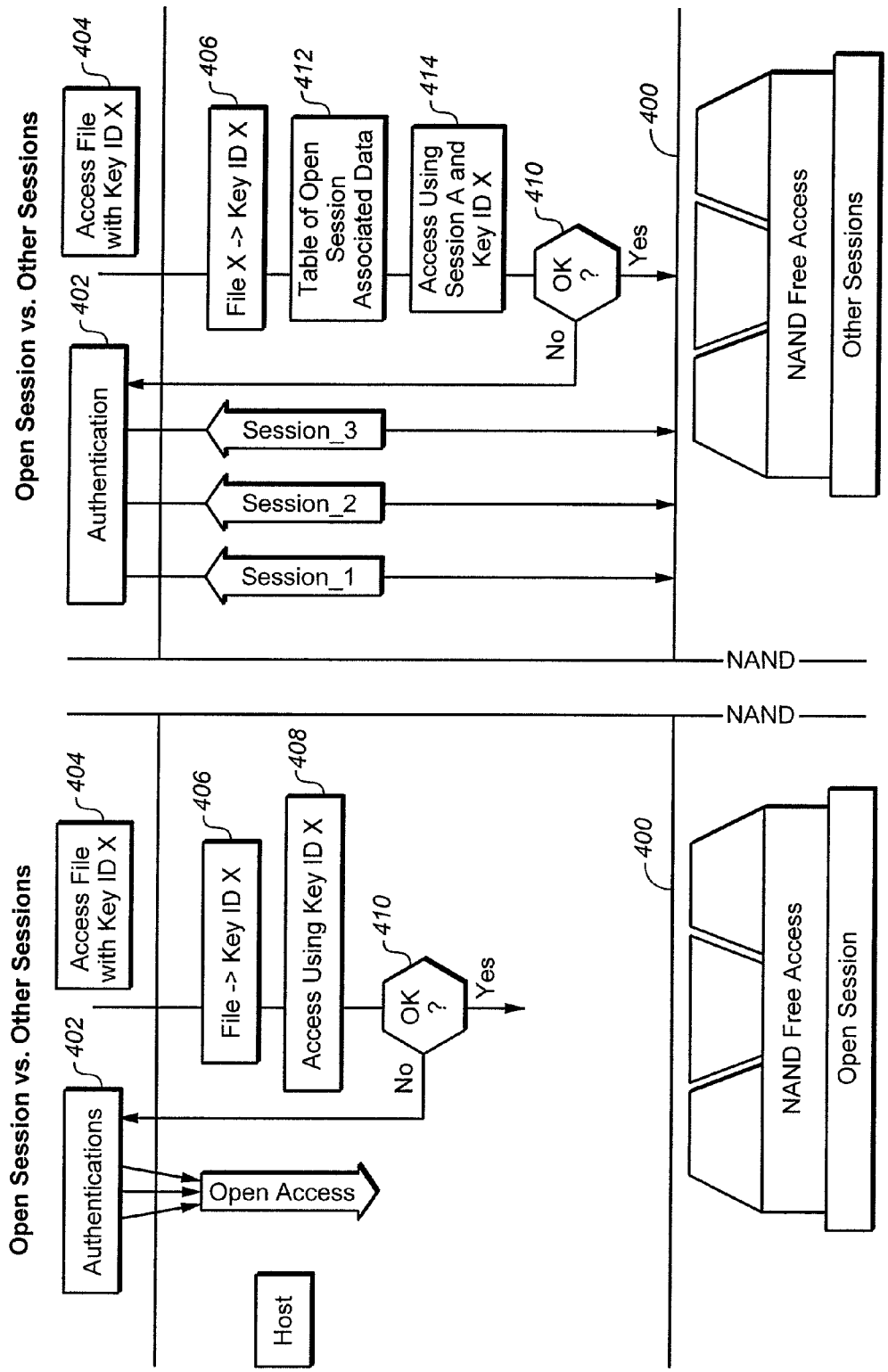
FIGS. 17A and 17B are schematic views illustrating an organization of a rule structure for authentication and policies for granting access to cryptographic keys to illustrate another embodiment of the invention.

The Open session can also be used for cases where a partition or a key needs to be protected. However, after a valid authentication process, access is granted to all entities on the host. The only thing the various host applications need to share, in order to get the permissions of the authenticated ACR is the session-id. This is illustrated in FIG. 17A. The steps above the line 400 are those taken by the host 24. After an entity is authenticated (block 402) for ACR1, it requests access to a file associated with a key ID X in the memory device 10 (blocks 404, 406 and 408). If the PCR of the ACR 1 allows such access, device 10 grants the request (diamond 410). If not, the system returns to block 402. After authentication is completed, the memory system 10 identifies the entity issuing a command only by the assigned session id (and not the ACR credentials). Once the ACR 1 gains access to the data associated with the key IDs in its PCR, in an open session, any other application or user can access the same data by specifying the correct session ID which is shared between the different applications on the host 24. This feature is advantageous in applications where it is more convenient to the user to be able to log in only once, and be able to access all the data tied to the account through which the log in is performed for different applications. Thus, a cellular phone user may be able to access stored emails, and listen to stored music in memory 20 without having to log in multiple times. On the other hand, data not encompassed by the ACR1 will not be accessible. Thus, the same cellular phone user may have valuable content such as games and photographs accessible through a separate account ACR2. This is data that he does not wish others who borrow his phone to access, even though he may not mind others accessing data available through his first account ACR1. Separating access to the data into two separate accounts while allowing access to ACR1 in open session provides ease of use as well as affording protection of valuable data.

To even further ease the process of sharing the session-id amongst the host applications, when an ACR is requesting an Open session it can specifically request that the session will be assigned the "0 (zero)" id. This way, applications can be designed to use a pre-defined session-id. The only restriction is, for obvious reasons, that only one ACR, requesting session 0, can be authenticated at a specific time. An attempt to authenticate another ACR requesting session 0, will be rejected.

Secure Session

To add a layer of security, the session id may be used as shown in FIG. 17B. The memory 10 then also stores the session ids of the active sessions. In FIG. 17B, for example, in order to be able to access a file associated with key ID X, the entity will need to also provide a session id, such as session id "A" before it is allowed to access the file (blocks 404, 406, 412 and 414). In this manner, unless the requesting entity is aware of the correct session id, it cannot access the memory 10. Since the session id is deleted after the session is over and will be different for each session, an entity can gain access only when it has been able to provide the session number.

The SSA system has no way to make sure that a command is really coming from the correct authenticated entity, other than by using the session number. For applications and use cases where there is a threat that attackers will try to use an open channel to send malicious commands, the host application uses a secure session (a secure channel).

When using a secure channel, the session-id, as well as the entire command, is encrypted with the secure channel encryption (session) key and the security level is as high as the host side implementation.

Terminating a Session

A session is terminated and, the ACR is logged off, in any one of the following scenarios:

1. The entity issues an explicit end-session command.

2. Time out on communication. A specific entity issued no command for a time period defined as one of the ACR parameters.

3. All open sessions are terminated after device (e.g. flash card) reset and/or power cycle.

Data Integrity Services

The SSA system verifies the integrity of the SSA database (which contains all the ACRs, PCRs, etc . . . ). In addition data integrity services are offered for entity data through the key ID mechanism.

If a key ID is configured with Hashed as its encryption algorithms the hash values are stored along side with the CEK and IV in the CEK record. Hash values are calculated and stored during write operation. Hash values are again calculated during read operations and compared with the values stored during the previous write operations. Every time the entity is accessing the key ID the additional data is concatenated (cryptographically) to the old data and the appropriate Hash value (for read or for write) updated.

Since only the host knows the data files associated with or pointed to by a key ID, the host explicitly manages several aspects of the data integrity function in the following manner:

1. A data file associated with or pointed to by a key ID is written or read from the beginning to end. Any attempt to access portions of the file will mess it up since the SSA system is using a CBC encryption method and generates a hashed message digest of the entire data 2. There is no need to process the data in a contiguous stream (the data stream can be interleaved with data streams of other key Ids and may be split over multiple sessions) since intermediate Hash values are maintained by the SSA system. However, the entity will need to explicitly instruct the SSA system to reset the Hash values if the data stream is restarted.

3. When a read operation is completed, the host must explicitly request the SSA system to validate the read Hash by comparing it with the Hash value calculated during the write operation.

4. The SSA system provides a "dummy read" operation as well. This feature will stream the data through the encryption engines but will not send it out to the host. This feature can be used to verify data integrity before it is actually read out of the device (e.g. flash card).

Random Number Generation

The SSA system will enable external entities to make use of the internal random number generator and request random numbers to be used outside of the SSA system. This service is available to any host and does not require authentication.

RSA Key Pair Generation

The SSA system will enable external users to make use of the internal RSA key pair generation feature and request an RSA key pair to be used outside of the SSA system. This service is available to any host and does not require authentication.

Alternative Embodiment

Figure 18:
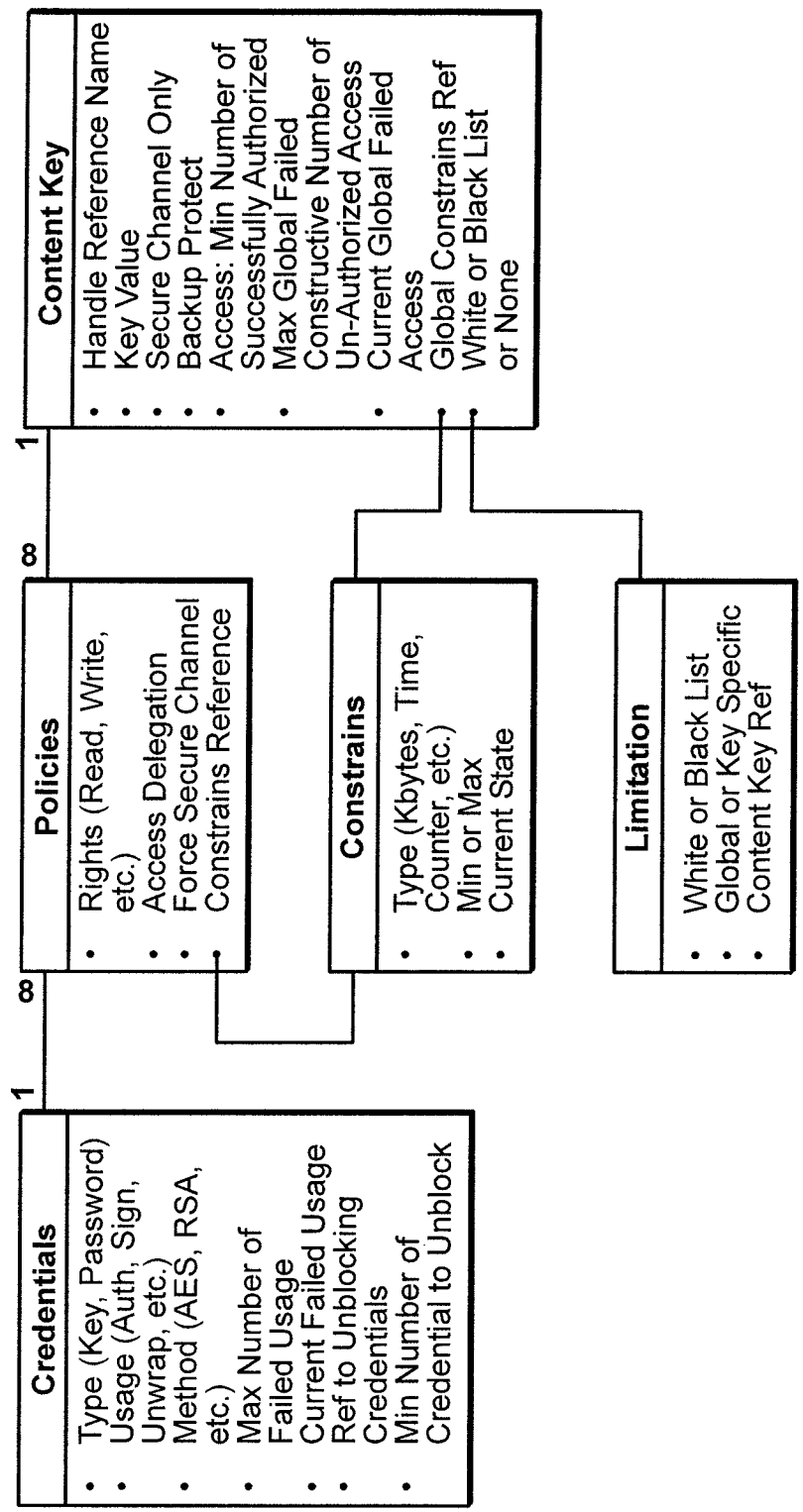
FIG. 18 is a flow diagram illustrating sessions of authentication and access when some sessions are open.

Instead of using a hierarchical approach, similar results can be achieved using a data base approach, as illustrated in FIG. 18.

As shown in FIG. 18, a list of credentials for entities, authentication methods, the maximum number of failed attempts, and the minimum number of credentials needed to unblock may be entered into a database stored in controller 12 or memory 20, which relates such credential requirements to the policies (read, write access to keys and partitions, secure channel requirement) in the database carried out by the controller 12 of memory 10. Also stored in the database are constraints and limitations to the access to keys and partitions. Thus, some entities (e.g. system administrator) may be on a white list, which means that these entities can always access all keys and partitions. Other entities may be on a black list, and their attempts to access any information will be blocked. The limitation can be global, or key and/or partition specific. This means that only certain entities can always access certain specific keys and partitions, and certain entities always cannot do so. Constraints can also be put on the content itself, irrespective of the partition it is in or the key used to encrypt or decrypt it. Thus, certain data (e.g. songs) may have the attribute that they can only be accessed by the first five host devices that access them, or that other data (e.g. movies) can only be read for a limited number of times, irrespective of which entities had access.

Authentication

Password Protection

Password-protect means that a password needs to be presented to access the protected area. Unless it cannot be more than one password then passwords could be associated with different rights such as read access or read/write access.

Password protect means that the device (e.g. flash card) is able to verify a password provided by the host i.e. the device also has the password stored in device managed secured memory area.

Issues and Limitations

Passwords are subject to replay attack. Because the password does not change after each presentation it can be identically resent. It means that password as is must not be use if the data to be protected are valuable, and the communication bus is easily accessible.

Password could protect access to stored data but should NOT be used to protect data (not a key)

To increase the security level associated with passwords, they can be diversified using a master key, with the result that hacking one does not crack entire system. A session key based secure communication channel can be use to send the password.

Figure 19:
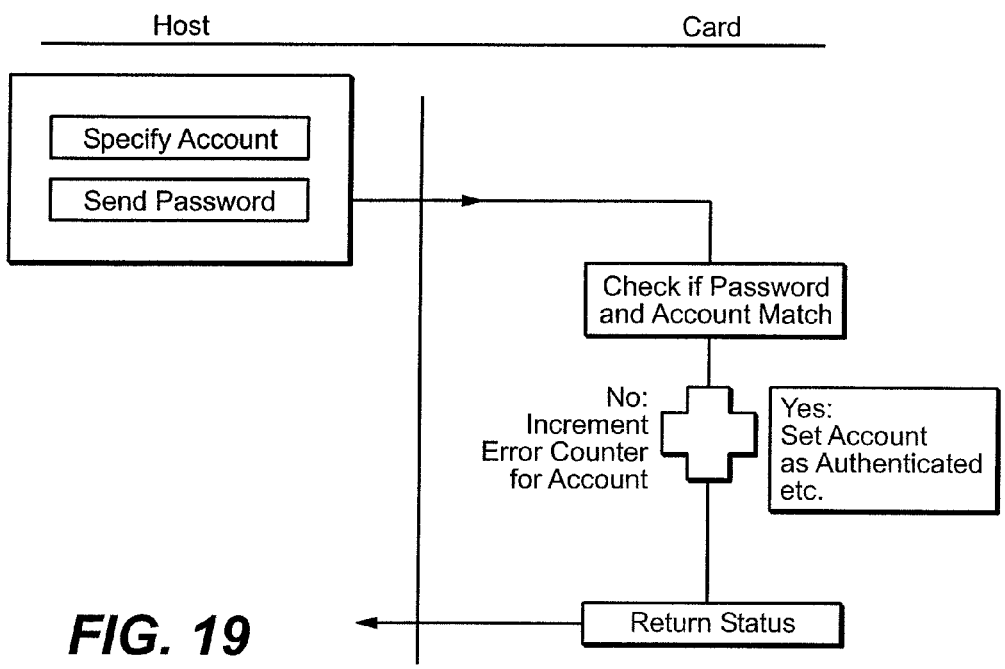
FIG. 19-22 are flow charts illustrating different authentication processes.

FIG. 19 is a flow chart illustrating authentication using a password. The entity sends in an account id and password to system 10 (e.g. flash memory card). The system checks to see if the password matches that in its memory. If it matches, authenticated status is returned. Otherwise, the error counter is incremented for that account, and the entity is asked to re-enter an account id and password. If the counter overflows, the system return status that access is denied.

Challenge Response

Figure 20:
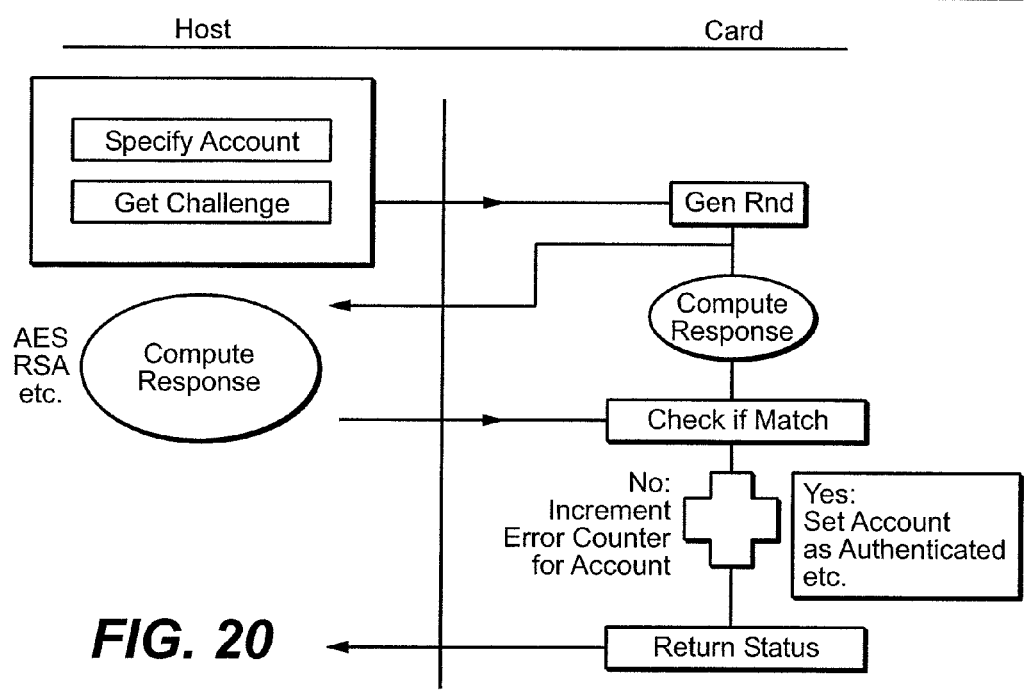

FIG. 20 is a Flow Chart illustrating authentication using a challenge/response type method. The entity sends in an account id and requests a challenge from system 10. System 10 generates a random number and presents it to the host. The host computes a response from the number and sends it to the system 10. System 10 compares the response to the value stored. The remaining steps are similar to those in FIG. 19 for determining whether to grant access.

Figure 21:
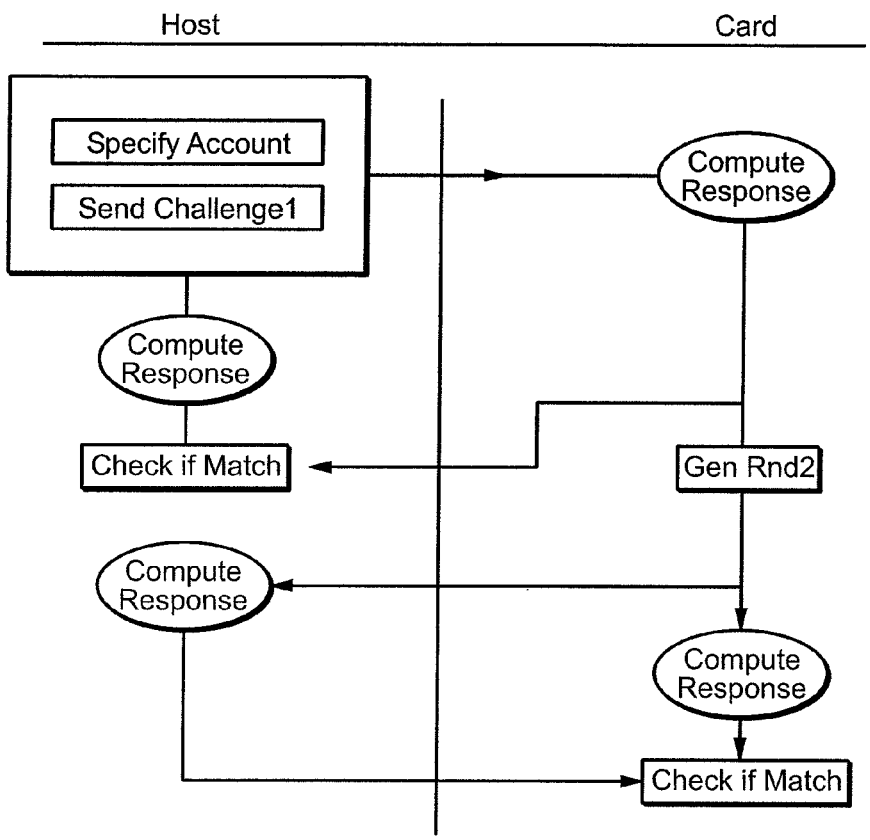

FIG. 21 is a Flow Chart illustrating authentication using another challenge/response type method. FIG. 21 differs from that in FIG. 20 in that, in addition to requiring the host to be authenticated by the system 10, it also requires the system 10 to be authenticated by a challenge/response where system 10 also requests a challenge from the host and returns a response to be checked by the host.

Figure 22:
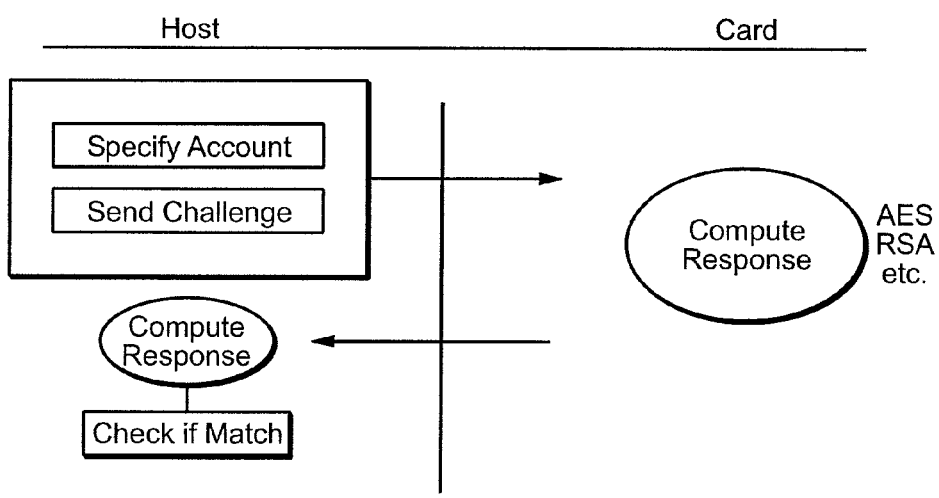

FIG. 22 is a Flow Chart illustrating authentication using another challenge/response type method. In this case, only the system 10 needs to be authenticated, where the host sends a challenge to system 10, which computes a response that is checked by the host for a match with its record of system 10.

Symmetric Key

Symmetric key algorithm means that the SAME key is used on both sides to encrypt and decrypt. It means that the key must have been pre-agreed prior to communicating. Also each side should implement the reverse algorithm of each other i.e. encrypt algorithm on one side and decrypt on the other. Both sides do not need to implement both algorithms to communicate.

Authentication

Symmetric key authentication means that device (e.g. flash card) and host share the same key and have the same cryptographic algorithm (direct and reverse e.g. DES and DES-1).

Symmetric key authentication means challenge-response (protect against replay attack). The protected device generates a challenge for the other device and both compute the response. The authenticating device sends back the response and the protected device check the response and validate authentication accordingly. Then rights associated with authentication can be granted.

Authentication could be:

External: the device (e.g. flash card) authenticates the outside world i.e. the device validates credentials of a given host or application Mutual: a challenge is generated on both sides Internal: the host application authenticates the device (e.g. flash card) i.e. host checks if device is genuine for its application.

To increase the security level of the entire system (i.e. breaking one does not break all)

Symmetric key are usually combined with diversification using a master key

Mutual authentication uses challenge from both side to ensure challenge is a real challenge Encryption Symmetric key cryptography is also used for encryption because it is a very efficient algorithm i.e. it does not need a powerful CPU to handle cryptography.

When used to secure a communication channel:
Both devices have to know the session key used to secure the channel (i.e. encrypt all outgoing data and decrypt all incoming data). This session key is usually established using a pre-shared secret symmetric key or using PKI.
Both devices have to know and implement the same cryptographic algorithms Signature Symmetric key can also be used to sign data. In that case the signature is a partial result of the encryption. Keeping the result partial allows to sign as many time as needed without exposing the key value.

Issues and Limitations

Symmetric algorithms are very efficient and secure but they are based on a pre-shared secret. The issue is securely share this secret in a dynamic manner and possibly to have it random (like a session key). The idea is that a shared secret is hard to keep safe in a long term and is almost impossible to share with multiple people.

To facilitate this operation, public key algorithm has-been invented as it allows the exchange of secrets without sharing them.

Public Key Cryptography

Asymmetric key algorithm is commonly referred Public Key cryptograph. It is a quite complex and usually CPU intensive mathematical implementation. It has been invented to solve the issues of key distribution associated with symmetric key algorithms. It also provides signing capabilities used to ensure data integrity.

Asymmetric key algorithm uses a key which has private and public elements respectively referred as private key and public key. Both private key and public key are mathematically linked together. The public key can be shared whereas the private has to remain secret. As for the keys, asymmetric algorithm uses two mathematical functions (one for the private key and one for the public key) to provide wrap and unwrap or sign and verify.

Key Exchange and Key Distribution

Key exchange becomes very simple using PK algorithm. The device sends its public key to the other device. The other device wraps its secret key with the public key and returns the encrypted data to the first device. The first device uses its private key to unwrap the data and retrieve the secret key which is now known to both sides and can be used to exchange data. Because the symmetric key can be exchanged that easily it is usually a random key.

Signature

Because of its nature public key algorithm is usually used only to sign small amount of data. To ensure data integrity it is then combine with a hash function that provides a one-way foot print of the message.

The Private key is used to sign the data. The public key (freely available) allows to verify the signature.

Authentication

Authentication usually uses signature: a challenge is signed and returned for validation The public part of the key is used for verification. Because anyone can generate a key pair, there is a need to certify the owner of the public key in order to prove that this is the right person using the correct key. Certification authority provides certification and will include the public key in a signed certificate. The certificate is signed by the authority itself. Then using a public key to verify a signature means that the authority that issued the certificate containing that key is trusted and that one is able to verify that the certificate has not been hacked i.e. that the certificate hash signed by the authority is correct; meaning that the user has and trusts the authority public key certificate.

The most common way to provide PK authentication is to trust the authority or root certificate and indirectly trust all key pairs certified by the given authority. Authenticating is then a matter of proving that the private key that one has matches the certificate by signing a challenge and providing the challenge response, and the certificate. Then certificate is checked to make sure it has not been hacked and it is signed by a trusted authority. Then the challenge response is verified. Authentication is successful if the certificate is trusted and the challenge response is correct.

Authentication in a device (e.g. flash card) means that the device is loaded with trusted root certificates and that the device is able to verify the challenge response as well as the certificate signed hash.

File Encryption

PK algorithm is not used to encrypt large amounts of data because it is too CPU intensive, but is usually used to protect a randomized encryption/decryption key generated to encrypt the content. For example SMIME (Secure email) generate a key which is then encrypted with all recipients' public key.

Issues and Limitations

Because anything can generate a key pair, it has to be certified to ensure its origin. During key exchange one may want to make sure that the secret key is provided to the right device i.e. the origin of the provided public key will need to be checked. Certificate management then becomes part of the security as it can inform about the validity of the key, and whether the key has been revoked.

While the invention has been described above by reference to various embodiments, it will be understood that changes and modifications may be made without departing from the scope of the invention, which is to be defined only by the appended claims and their equivalent. All references referred to herein are incorporated by reference.

What is claimed is:

1. A method for protecting data stored in a storage device, the method comprising:
   performing by a controller in the storage device, wherein the storage device is in communication with a host device:
   receiving a request for generation of a key value, the request including a distinct reference name for the key value;
   generating the key value and saving the key value and its reference name, wherein the reference name is assigned to the key value after the key value has been generated, and wherein the key value is accessible only internally within the storage device;
   receiving one or more policies applicable to usage of the key value, the one or more policies concerning different permissions, granted to authenticated entities, to request the storage device to use the key value for encrypting and/or decrypting data; and
   saving the one or more policies, wherein a request received by the storage device, which request contains the reference name for using the key value in encryption or decryption of data written or read, respectively, in the storage device, would be granted or denied based on the one or more policies.

2. The method of claim 1, further comprising accessing data in the storage device in the form of files, wherein a controller in the storage device is not aware of files.

3. The method of claim 1, wherein the one or more policies permit one or more entities in a set of entities to use the key value for accessing the same data stored in the storage device and prevent entities not in the set to use the key value for accessing data stored in the storage device.

4. The method of claim 1, wherein the one or more policies permit a first set of one or more entities to use the key value to encrypt and/or decrypt data and to write and read data from the storage device and a second set of one or more entities to use the key value to only decrypt data in the storage device and read the decrypted data.

5. The method of claim 1, wherein the one or more policies permit a set of one or more entities to use the key value to only encrypt data and write the encrypted data to the storage device, to only decrypt data in the storage device and read the decrypted data, or both.

6. The method of claim 1, wherein the one or more policies permit an entity to delete access rights to the storage device of another entity or alter the one or more policies to disallow access by another entity to use the key value, where said another entity was permitted such access prior to the alteration.

7. The method of claim 1, wherein the one or more policies permit-an entity to delegate access rights to the key value to another entity or alter the one or more policies to permit such delegation.

8. The method of claim 1, wherein the one or more policies require establishment of a secure channel for at least one entity to access the storage device or the key value.

9. The method of claim 1, wherein the one or more policies require the establishment of a secure channel for access to the storage device, or to the key value.

10. The method of claim 1, wherein the one or more policies permit access to the storage device, or to the key value, only by a limited number of entities.

11. The method of claim 1, wherein the one or more policies permit access to the storage device, or to the key value, only by a limited number of entities irrespective of whether an entity has been authenticated.

12. The method of claim 1, wherein the one or more policies do not require establishment of a secure channel for at least one entity to access the storage device or the key value.

13. The method of claim 1, further comprising receiving at least one of the following:
an additional policy applicable to usage of the key value; and
a request for generation of an additional key value.

14. The method of claim 1, wherein the one or more policies permit different sets of entities to make different uses of the key value and have different access rights to data, the different uses of the key value including one or both of encryption and decryption and the different access rights including one or both of reading and writing data.

15. The method of claim 1, wherein the storage device stores a plurality of files, wherein each file is encrypted with a different respective key value having a different respective reference name, and wherein the method further comprises receiving a request from an entity to read one of the plurality of files and decrypting the one of the plurality of files only if the entity provided a reference name of a key value used to encrypt the one of the plurality of files.

16. The method of claim 15, wherein the method further comprises decrypting the one of the plurality of files only if the entity has permission to use the key value.

17. The method of claim 1, wherein the method further comprises:
receiving two or more records, each record containing an authentication requirement for and permission(s) for controlling access to data in the storage device by an entity, wherein the two or more of the records received differ from each other in at least one of the authentication requirement(s) and the permission(s); and
saving the at least two records, wherein a request received by the storage device to access data stored therein would be granted or denied to an entity based on its corresponding one of the two or more records.

18. The method of claim 17, wherein each of the at least two records contain permission(s) to access partitions in the storage device by the corresponding entity, wherein the permission(s) in the records of the at least two corresponding entities for accessing partitions are not entirely the same.

19. The method of claim 1, wherein the key value remains in the storage device during encrypting and/or decrypting.

20. The method of claim 1, wherein the reference name for the key value does not identify the data.

21. The method of claim 1, wherein the request further contains a logical address, and wherein the reference name is for using the key value in encryption or decryption of data written to or read from, respectively, a physical address in the storage device corresponding to the logical address.

22. A storage device comprising:
an interface configured to place the storage device in communication with a host device; and
a controller in communication with the interface, wherein the controller is configured to:
receive a request for generation of a key value, the request including a distinct reference name for the key value;
generate the key value and save the key value and its reference name, wherein the reference name is assigned to the key value after the key value has been generated, and wherein the key value is accessible only internally within the storage device;
receive one or more policies applicable to usage of the key value, the one or more policies concerning different permissions, granted to authenticated entities, to request the storage device to use the key value for encrypting and/or decrypting data; and
save the one or more policies, wherein a request received by the storage device, which request contains the reference name for using the key value in encryption or decryption of data written or read, respectively, in the storage device, would be granted or denied based on the one or more policies.

23. The storage device of claim 22, wherein the controller is further configured to access data in the storage device in the form of files, and wherein the controller in the storage device is not aware of files.

24. The storage device of claim 22, wherein the one or more policies permit one or more entities in a set of entities to use the key value for accessing the same data stored in the storage device and prevent entities not in the set to use the key value for accessing data stored in the storage device.

25. The storage device of claim 22, wherein the one or more policies permit a first set of one or more entities to use the key value to encrypt and/or decrypt data and to write and read data from the storage device and a second set of one or more entities to use the key value to only decrypt data in the storage device and read the decrypted data.

26. The storage device of claim 22, wherein the one or more policies permit a set of one or more entities to use the key value to only encrypt data and write the encrypted data to the storage device, to only decrypt data in the storage device and read the decrypted data, or both.

27. The storage device of claim 22, wherein the one or more policies permit an entity to delete access rights to the storage device of another entity or alter the one or more policies to disallow access by another entity to use the key value, where said another entity was permitted such access prior to the alteration.

28. The storage device of claim 22, wherein the one or more policies permit-an entity to delegate access rights to the key value to another entity or alter the one or more policies to permit such delegation.

29. The storage device of claim 22, wherein the one or more policies require establishment of a secure channel for at least one entity to access the storage device or the key value.

30. The storage device of claim 22, wherein the one or more policies require the establishment of a secure channel for access to the storage device, or to the key value.

31. The storage device of claim 22, wherein the one or more policies permit access to the storage device, or to the key value, only by a limited number of entities.

32. The storage device of claim 22, wherein the one or more policies permit access to the storage device, or to the key value, only by a limited number of entities irrespective of whether an entity has been authenticated.

33. The storage device of claim 22, wherein the one or more policies do not require establishment of a secure channel for at least one entity to access the storage device or the key value.

34. The storage device of claim 22, wherein the controller is further configured to receive at least one of the following:
   an additional policy applicable to usage of the key value; and
   a request for generation of an additional key value.

35. The storage device of claim 22, wherein the storage device receives the request for generation of the key value and the reference name for the key value from the host.

36. The storage device of claim 22, wherein the one or more policies permit different sets of entities to make different uses of the key value and have different access rights to data, the different uses of the key value including one or both of encryption and decryption and the different access rights including one or both of reading and writing data.

37. The storage device of claim 22, wherein the storage device stores a plurality of files, wherein each file is encrypted with a different respective key value having a different respective distinct reference name, and wherein the controller is further configured to receive a request from an entity to read one of the plurality of files and decrypting the one of the plurality of files only if the entity provided a reference name of a key value used to encrypt the one of the plurality of files.

38. The storage device of claim 37, wherein the controller is further configured to decrypt the one of the plurality of files only if the entity has permission to use the key value.

39. The storage device of claim 22, wherein the controller is further configured to:
   receive two or more records, each record containing an authentication requirement for and permission(s) for controlling access to data in the storage device by an entity, wherein the two or more of the records received differ from each other in at least one of the authentication requirement(s) and the permission(s); and
   save the at least two records, wherein a request received by the storage device to access data stored therein would be granted or denied to an entity based on its corresponding one of the two or more records.

40. The storage device of claim 39, wherein each of the at least two records contain permission(s) to access partitions in the storage device by the corresponding entity, wherein the permission(s) in the records of the at least two corresponding entities for accessing partitions are not entirely the same.

41. The storage device of claim 22, wherein the key value remains in the storage device during encrypting and/or decrypting.

42. The storage device of claim 22, wherein the reference name for the key value does not identify the data.

43. The storage device of claim 22, wherein the request further contains a logical address, and wherein the reference name is for using the key value in encryption or decryption of data written to or read from, respectively, a physical address in the storage device corresponding to the logical address.

* * * * *